US012605817B2

(12) United States Patent
Wechselberger et al.

(10) Patent No.: US 12,605,817 B2
(45) Date of Patent: Apr. 21, 2026

(54) LIFTER ASSEMBLY FOR A POWERED FASTENER DRIVER

(71) Applicant: MILWAUKEE ELECTRIC TOOL CORPORATION, Brookfield, WI (US)

(72) Inventors: Marcus Wechselberger, Milwaukee, WI (US); Troy C. Thorson, Cedarburg, WI (US); David A. Bierdeman, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/973,612

(22) Filed: Dec. 9, 2024

(65) Prior Publication Data

US 2025/0100118 A1 Mar. 27, 2025

Related U.S. Application Data

(60) Continuation of application No. 18/339,278, filed on Jun. 22, 2023, now Pat. No. 12,172,274, which is a continuation of application No. 17/962,037, filed on Oct. 7, 2022, now Pat. No. 11,724,376, which is a division of application No. 16/696,818, filed on Nov. 26, 2019, now Pat. No. 11,498,194.

(Continued)

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .............. B25C 1/06; B25C 1/04; B25C 1/047
USPC .......................................................... 227/130
See application file for complete search history.

(56) References Cited

U.S. PATENT DOCUMENTS 4,573,624 A * 3/1986 Muller .................... H01F 7/064 227/8
8,011,441 B2 9/2011 Leimbach et al.
(Continued)

FOREIGN PATENT DOCUMENTS

WO 2016199670 A1 12/2016
WO 2019214087 A1 11/2019

OTHER PUBLICATIONS

International Search Report and Written Opinion for Application No. PCT/US2019/063396 dated Mar. 13, 2020 (11 pages).

*Primary Examiner* — Himchan Song
(74) *Attorney, Agent, or Firm* — Michael Best & Friedrich LLP

(57) ABSTRACT

A powered fastener driver includes a driver blade movable from a top-dead-center (TDC) position toward a driven or bottom-dead-center (BDC) position for driving a fastener into a workpiece, a gas spring mechanism for driving the driver blade toward the BDC position, and a lifter assembly having a rotary lifter for returning the driver blade from the BDC position toward the TDC position. The powered fastener driver further includes an arm upon which the rotary lifter is supported, a motor which, in a first position of the rotary lifter, provides torque to the rotary lifter to return the driver blade from the BDC position toward the TDC position, and a brake mechanism including an electromagnet which, when activated, causes the rotary lifter to move from the first position toward a second position in which the rotary lifter is not engageable with the driver blade.

13 Claims, 21 Drawing Sheets

Related U.S. Application Data

(60) Provisional application No. 62/807,875, filed on Feb. 20, 2019, provisional application No. 62/773,300, filed on Nov. 30, 2018, provisional application No. 62/771,743, filed on Nov. 27, 2018.

(56) References Cited

U.S. PATENT DOCUMENTS

| | | | | |
|---|---|---|---|---|
| 8,011,547 | B2 | 9/2011 | Leimbach et al. | |
| 8,230,941 | B2 | 7/2012 | Leimbach et al. | |
| 8,267,296 | B2 | 9/2012 | Leimbach et al. | |
| 8,267,297 | B2 | 9/2012 | Leimbach et al. | |
| 8,286,722 | B2 | 10/2012 | Leimbach et al. | |
| 8,387,718 | B2 | 3/2013 | Leimbach et al. | |
| 8,602,282 | B2 | 12/2013 | Leimbach et al. | |
| 8,763,874 | B2 | 7/2014 | McCardle et al. | |
| 9,676,088 | B2 | 6/2017 | Leimbach et al. | |
| 11,724,376 | B2 | 8/2023 | Wechselberger et al. | |
| 2006/0124331 | A1 * | 6/2006 | Stirm | F16D 43/208 173/178 |
| 2008/0210734 | A1 * | 9/2008 | Uejima | B25C 1/003 227/129 |
| 2009/0090759 | A1 | 4/2009 | Leimbach et al. | |
| 2009/0095787 | A1 * | 4/2009 | Liang | B25C 1/06 227/131 |
| 2015/0352702 | A1 * | 12/2015 | Chien | B25C 1/047 227/130 |
| 2016/0229043 | A1 * | 8/2016 | Wyler | B25C 1/047 |
| 2016/0288305 | A1 * | 10/2016 | McCardle | B25C 1/06 |
| 2017/0266796 | A1 | 9/2017 | Leimbach et al. | |
| 2017/0282341 | A1 | 10/2017 | Wolf et al. | |
| 2018/0154505 | A1 * | 6/2018 | Sato | B25C 1/06 |
| 2020/0223046 | A1 * | 7/2020 | Hoshino | B25C 1/06 |
| 2021/0162573 | A1 * | 6/2021 | Wolf | B25F 5/006 |

* cited by examiner

LIFTER ASSEMBLY FOR A POWERED FASTENER DRIVER

CROSS-REFERENCE TO RELATED APPLICATIONS

This application is a continuation of U.S. patent application Ser. No. 18/339,278 filed on Jun. 22, 2023, now U.S. Pat. No. 12,172,274, which is a continuation of U.S. patent application Ser. No. 17/962,037 filed on Oct. 7, 2022, now U.S. Pat. No. 11,724,376, which is a divisional of U.S. patent application Ser. No. 16/696,818 filed on Nov. 26, 2019, now U.S. Pat. No. 11,498,194, which claims priority to U.S. Provisional Patent Application No. 62/771,743 filed on Nov. 27, 2018, U.S. Provisional Patent Application No. 62,773,300 filed on Nov. 30, 2018, and U.S. Provisional Patent Application No. 62/807,875 filed on Feb. 20, 2019, the entire contents of all of which are incorporated herein by reference.

FIELD OF THE INVENTION

The present invention relates to powered fastener drivers, and more specifically to lifter mechanisms of powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.) to drive a driver blade from a top-dead-center position to a bottom-dead-center position.

SUMMARY OF THE INVENTION

The present invention provides, in one aspect, a powered fastener driver including a driver blade movable from a top-dead-center (TDC) position toward a driven or bottom-dead-center (BDC) position for driving a fastener into a workpiece, a gas spring mechanism for driving the driver blade toward the BDC position, and a lifter assembly having a rotary lifter for returning the driver blade from the BDC position toward the TDC position. The powered fastener driver further includes an arm upon which the rotary lifter is supported, a motor which, in a first position of the rotary lifter, provides torque to the rotary lifter to return the driver blade from the BDC position toward the TDC position, and a brake mechanism including an electromagnet which, when activated, causes the rotary lifter to move from the first position toward a second position in which the rotary lifter is not engageable with the driver blade.

The present invention provides, in another aspect, a powered fastener driver including a driver blade, defining a driving plane, movable from a top-dead-center (TDC) position toward a driven or bottom-dead-center (BDC) position for driving a fastener into a workpiece, a gas spring mechanism for driving the driver blade toward the BDC position, and a lifter assembly having a rotary lifter for returning the driver blade from the BDC position toward the TDC position. The powered fastener driver further includes a motor that provides torque to the rotary lifter to return the driver blade from the BDC position toward the TDC position. The rotary lifter includes a cam portion which, during rotation of the rotary lifter, causes the rotary lifter to axially move along a rotational axis defined by the rotary lifter between a first position, in which the rotary lifter is in the driving plane, and a second position, in which the rotary lifter is out of the driving plane.

The present invention provides, in yet another aspect, a powered fastener driver including a driver blade, defining a driving plane, movable from a top-dead-center (TDC) position toward a driven or bottom-dead-center (BDC) position for driving a fastener into a workpiece, a gas spring mechanism for driving the driver blade toward the BDC position, and a lifter assembly having a rotary lifter for returning the driver blade from the BDC position toward the TDC position. The powered fastener driver further includes a motor that provides torque to a drive shaft upon which the rotary lifter is coupled for selective co-rotation therewith to return the driver blade from the BDC position toward the TDC position, and a cam mechanism positioned between the drive shaft and the rotary lifter. During rotation of the rotary lifter and a reaction torque on the rotary lifter exceeds a predetermined torque limit, the cam mechanism moves the rotary lifter along a rotational axis of the rotary lifter from a first position, in which the rotary lifter is in the driving plane, and a second position, in which the rotary lifter is out of the driving plane.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
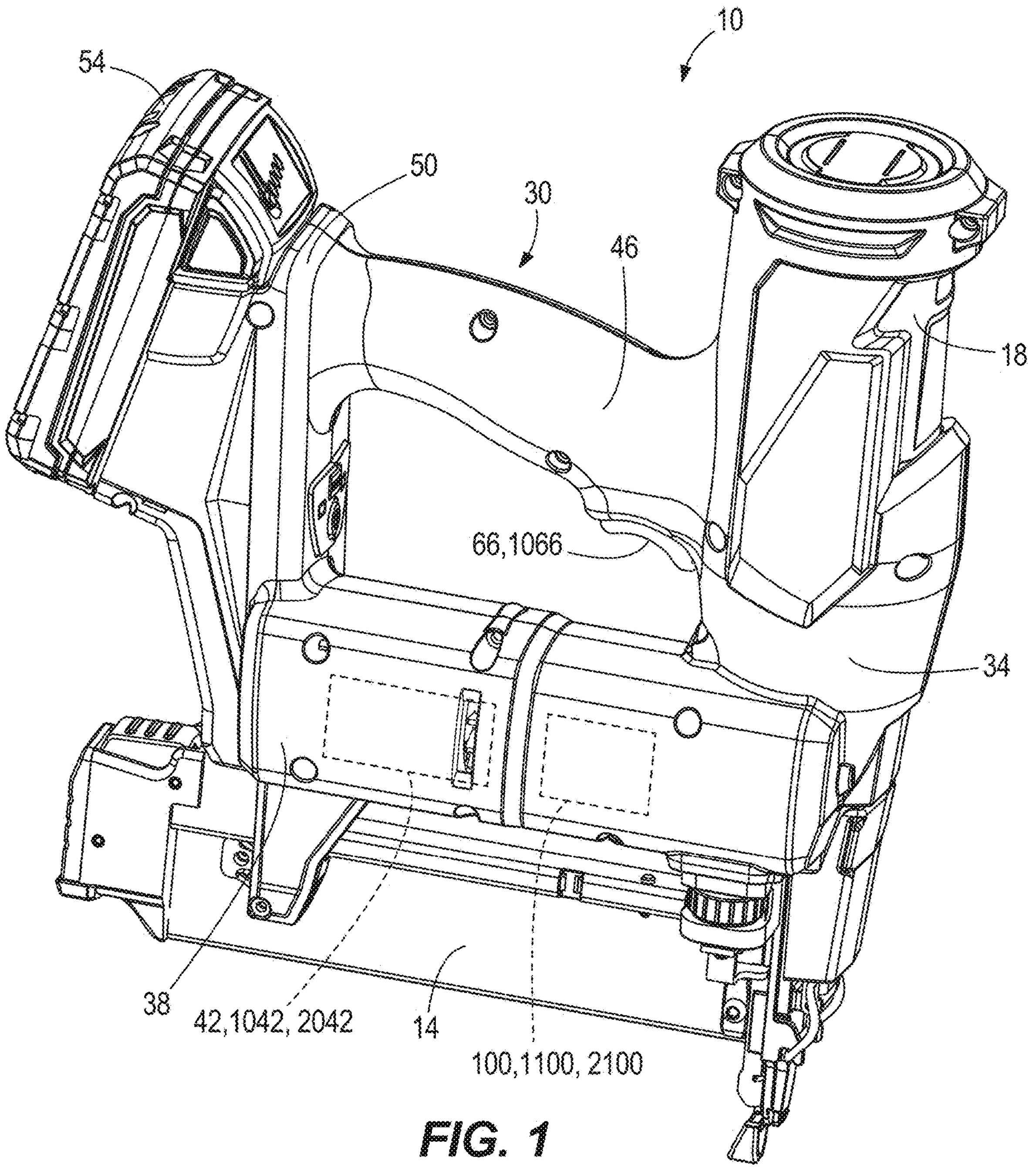
FIG. 1 is perspective view of a powered fastener driver in accordance with an embodiment of the invention.
Figure 2:
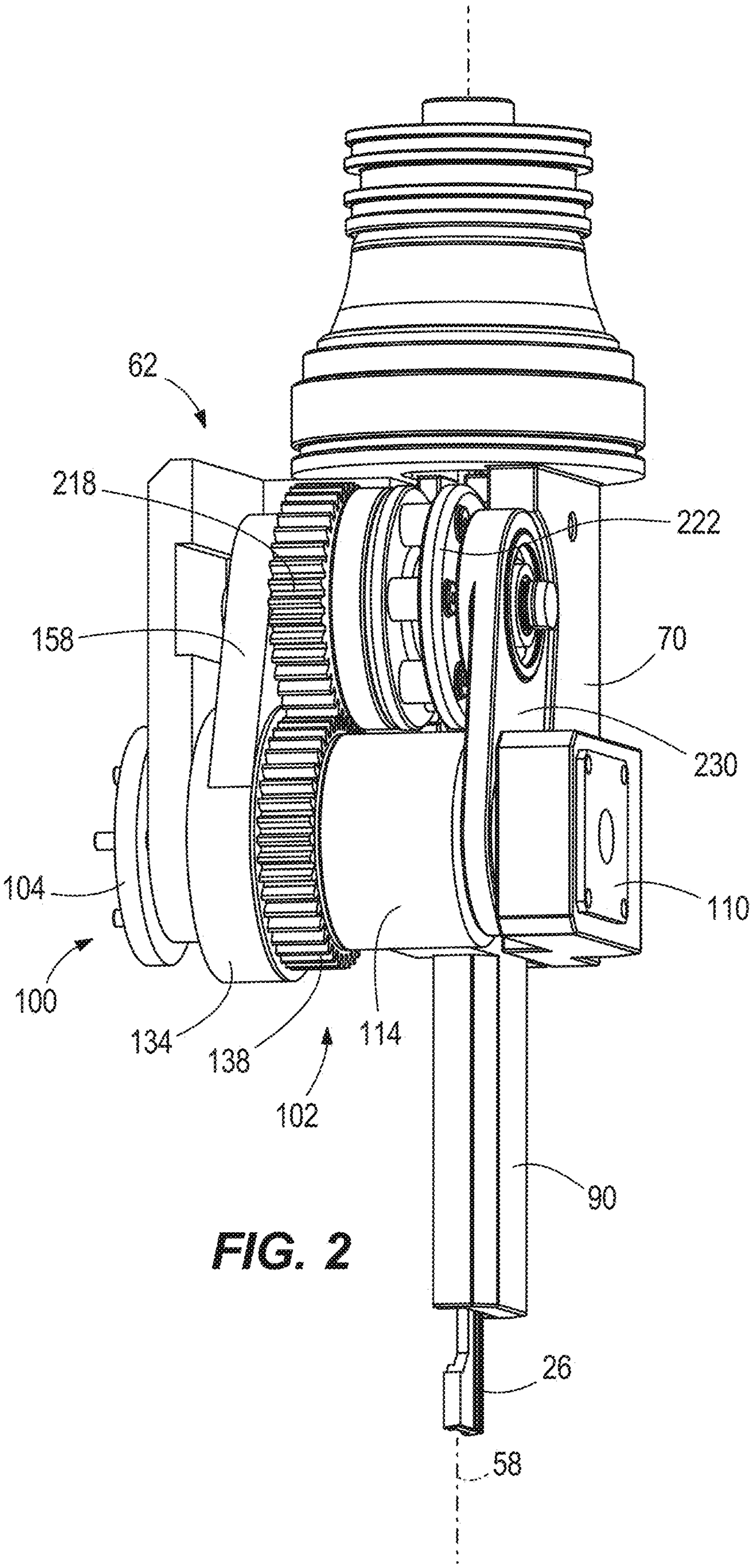
FIG. 2 is a perspective view of a lifter assembly and a brake mechanism of the powered fastener driver of FIG. 1.
Figure 3:
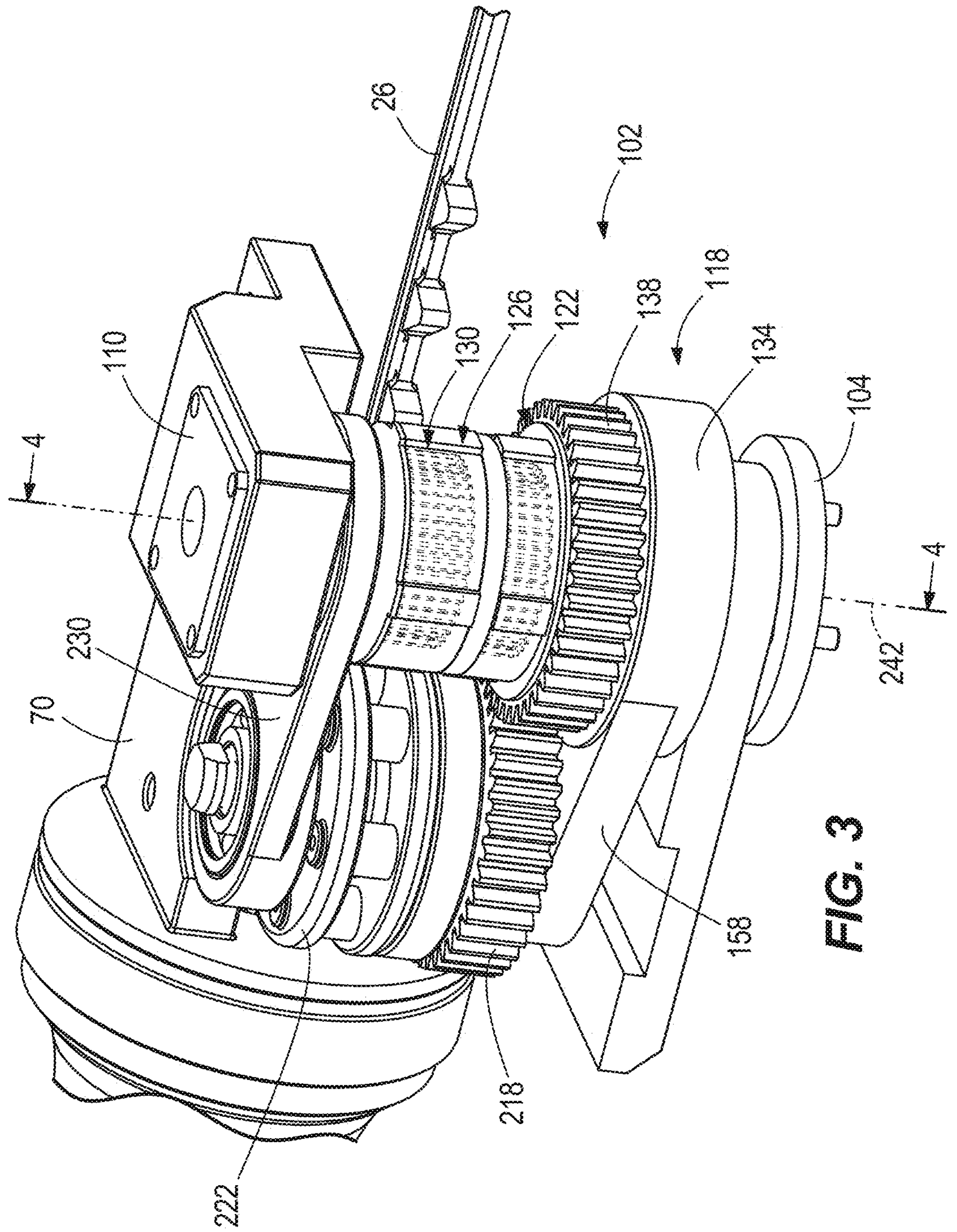
FIG. 3 is an enlarged perspective view of the lifter assembly and the brake mechanism of FIG. 2.

With reference to FIGS. 1 and 2, a gas spring-powered fastener driver 10 is operable to drive fasteners (e.g., nails, tacks, staples, etc.) held within a magazine 14 into a workpiece. The fastener driver 10 includes a cylinder 18. A moveable piston (not shown) is positioned within the cylinder 18. With reference to FIG. 3, the fastener driver 10 further includes a driver blade 26 that is attached to the piston and moveable therewith. The fastener driver 10 does not require an external source of air pressure, but rather includes pressurized gas in the cylinder 18.

With reference to FIG. 1, fastener driver 10 includes a housing 30 having a cylinder housing portion 34 and a motor housing portion 38 extending therefrom. The cylinder housing portion 34 is configured to support the cylinder 18, whereas the motor housing portion 38 is configured to support a motor 42. In addition, the illustrated housing 30 includes a handle portion 46 extending from the cylinder housing portion 34, and a battery attachment portion 50 coupled to an opposite end of the handle portion 46. A battery 54 is electrically connectable to the motor 42 for supplying electrical power to the motor 42. The handle portion 46 supports a trigger 66, which is depressed by a user to initiate a driving cycle of the fastener driver 10.

With reference to FIG. 2, the cylinder 18 and the driver blade 26 define a driving axis 58. During a driving cycle, the driver blade 26 and piston are moveable between a top-dead-center (TDC) or ready position, and a bottom-dead-center (BDC) or driven position, along the driving axis 58. The fastener driver 10 further includes a lifter assembly 62, which is powered by the motor 42 (FIG. 1), and which is operable to return the driver blade 26 from the driven position to the ready position. As explained in greater detail below, the driver blade 26 may stop (e.g., become jammed) at an intermediate position that is between the driven position and the ready position. In this situation, the lifter assembly 62 is also operable to return the driver blade 26 from the intermediate position to the ready position.

Figure 5:
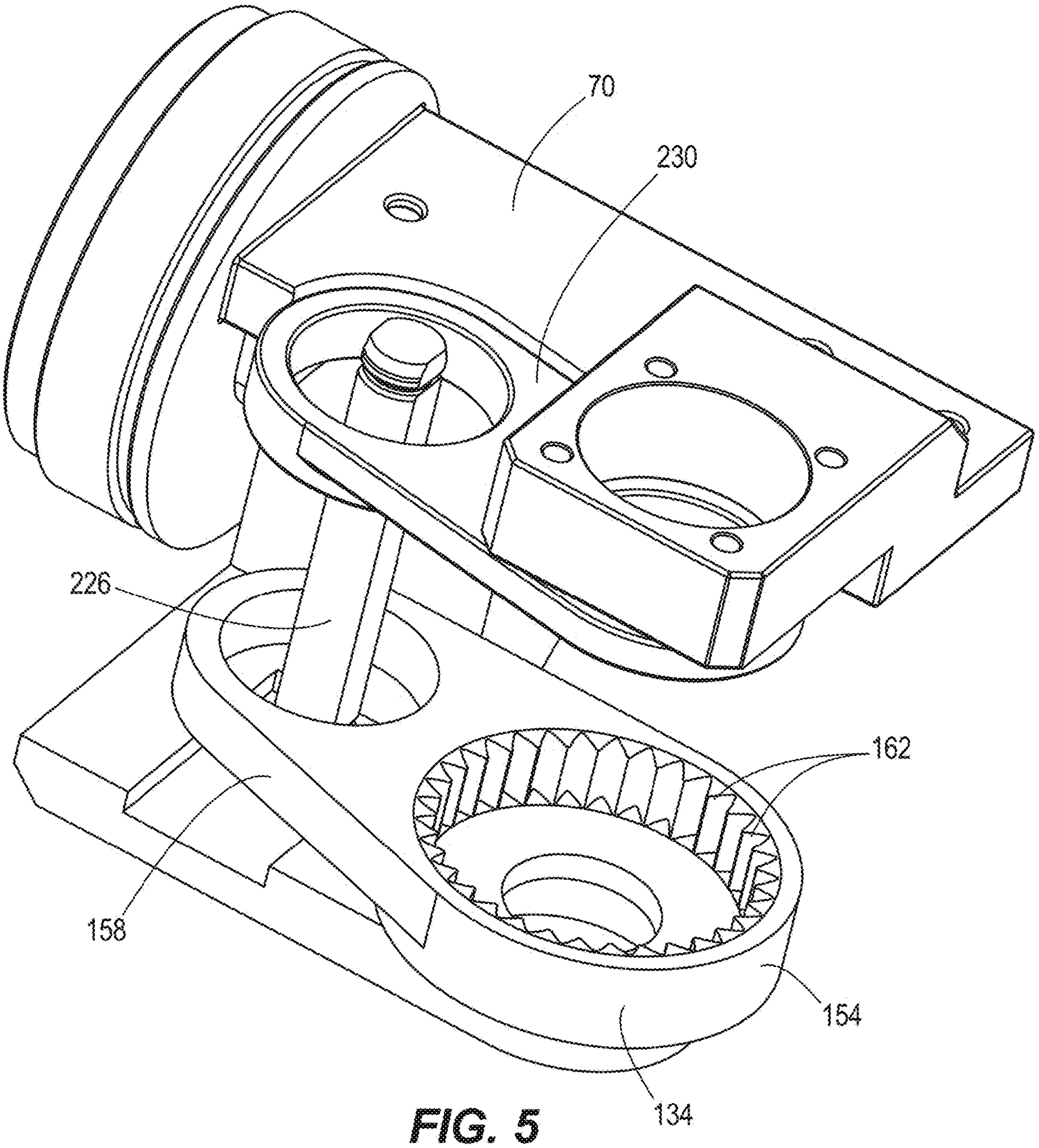
FIG. 5 is a perspective view of a portion of the lifter assembly of FIG. 2.

With reference to FIGS. 2 and 5, the powered fastener driver 10 further includes a frame 70 positioned within the housing 30. The frame 70 is configured to support the lifter assembly 62 within the housing 30. The fastener driver 10 further includes a blade guide 90 that partially surrounds the driver blade 26.

Figure 7:
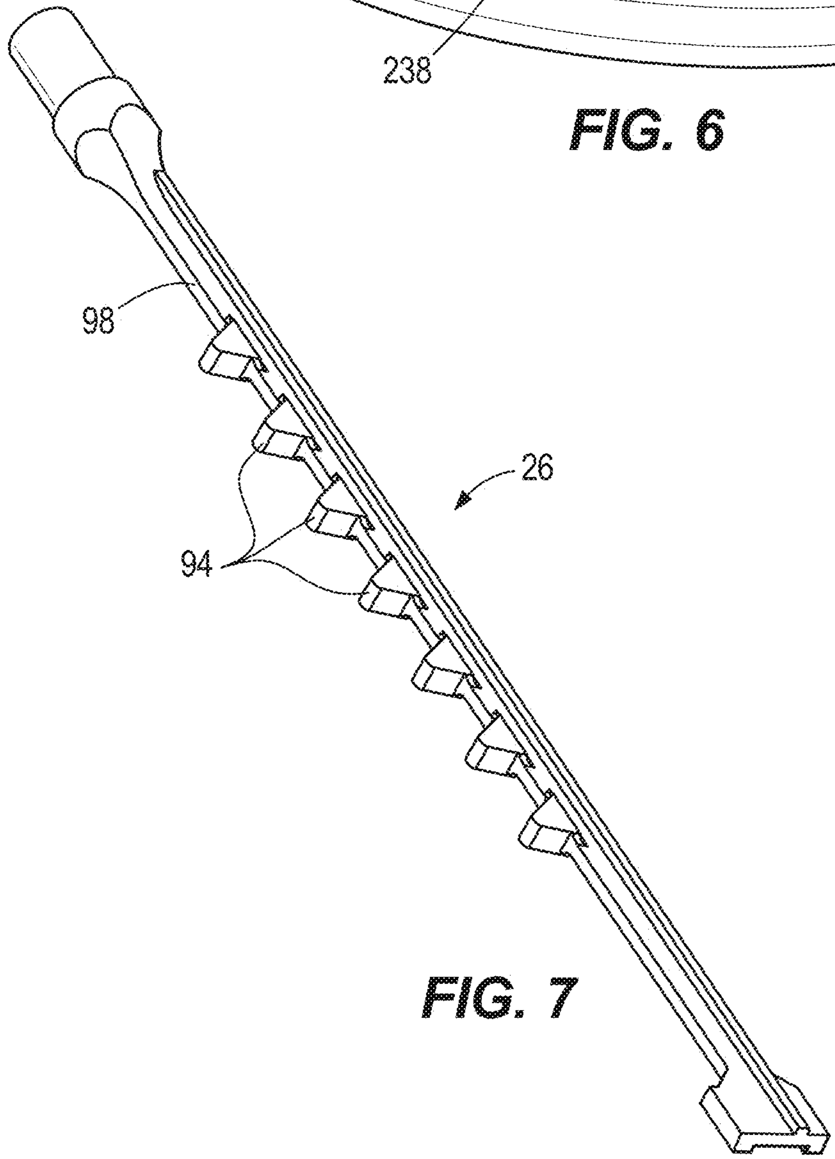
FIG. 7 is a perspective view of a driver blade of the powered fastener driver of FIG. 1.

With reference to FIG. 7, the driver blade 26 includes a plurality of lift teeth 94 formed along an edge 98 of the driver blade 26. As described earlier, the driver blade 26 defines the driving axis 58 along which it moves between the ready position and the driven position. The edge 98 extends in the direction of the driving axis 58. In particular, the lift teeth 94 project laterally from the edge 98 relative to the driving axis 58.

With reference to FIGS. 1-4, the motor 42 is coupled to a first gear train 100 and a second gear train 102. In particular, the first gear train 100 is downstream of the motor 42 and the second gear train 102 is downstream of the first gear train 100 such that torque is transferred from the motor

Figure 4:
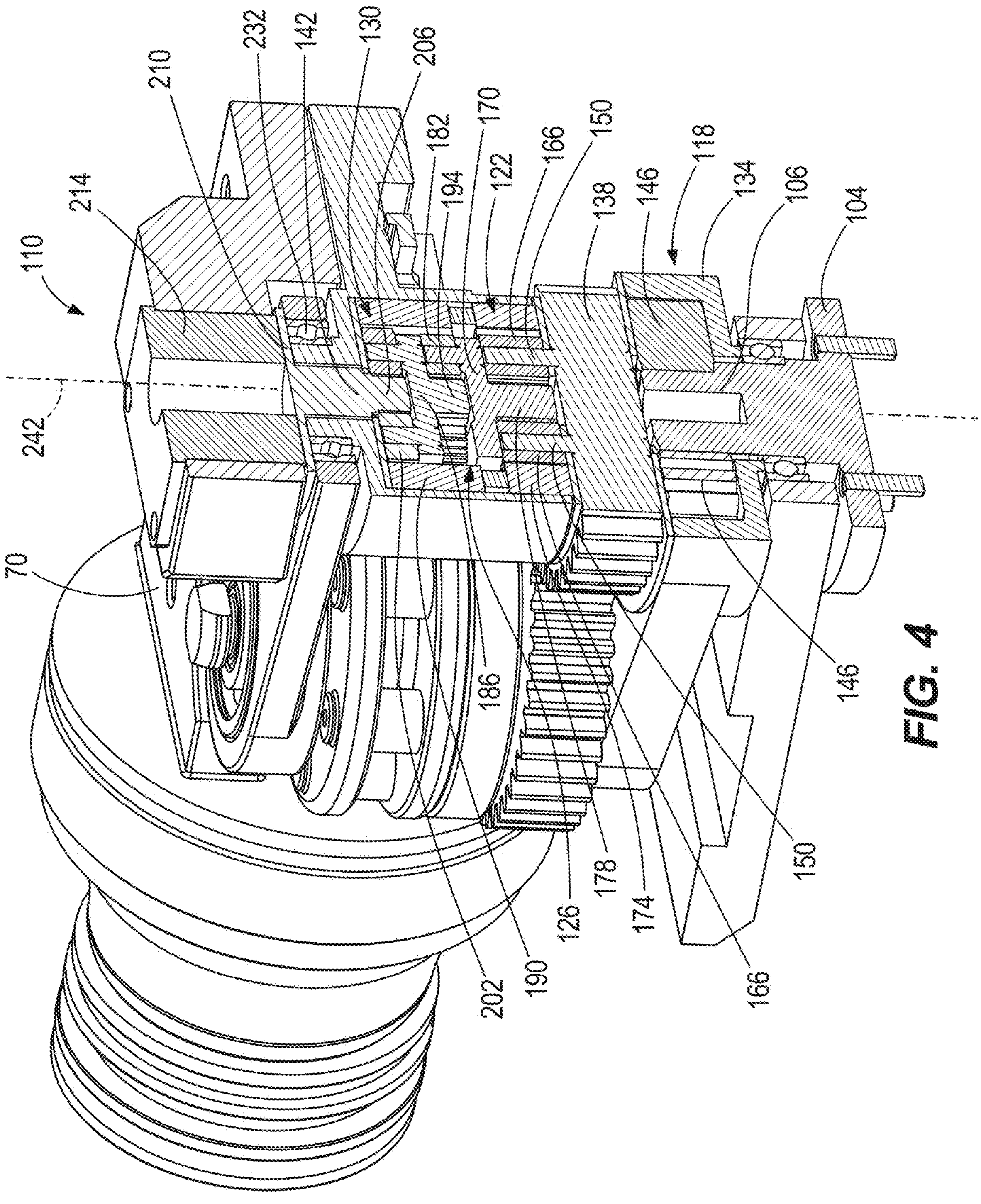
FIG. 4 is a cross-sectional view of the lifter assembly and the brake mechanism taken along line 4-4 shown in FIG. 3.

42 to the first gear train 100, and then from the first gear train 100 to the second gear train 102. Each of the first gear train 100 and the second gear train 102 is configured as a multi-stage planetary gear train. As shown in FIG. 2, a final stage of the first gear train 100 is coupled to a first stage of the second gear train 102. More specifically, a carrier 104 of the final stage of the first gear train 100 includes an input pinion 106 for driving the second gear train 102 (FIG. 4). Furthermore, the fastener driver 10 includes a brake mechanism 110 operatively coupled to a last stage (e.g., fourth stage) of the second gear train 102. The brake mechanism 110 is configured to selectively inhibit the transfer of torque through the second gear train 102.

With reference to FIGS. 2 and 3, the second gear train 102 includes a gear case 114 and four planetary stages 118, 122, 126, 130. In the illustrated construction of the second gear train 102, the first stage 118 includes a first stage ring gear 134 and a drive gear 138. The gear case 114 is positioned adjacent the first stage 118, and contains therein the remaining three planetary stages 122, 126, 130. The first stage ring gear 134, the drive gear 138, and the gear case 114 are positioned between the motor 42 and the brake mechanism 110 (FIG. 2).

With reference to FIG. 4, the first planetary stage 118 includes the first stage ring gear 134, the input pinion 106, a first stage carrier 138, which is also the drive gear, and a plurality of first stage planet gears 146. A plurality of axles (not shown) extend from the front of the drive gear 138 upon which the first stage planet gears 146 are rotatably supported. In addition, a plurality of axles 150 extend from the rear of the drive gear 138 upon which second stage planet gears 166 are rotatably supported. The first stage planet gears 146 are engaged with the input pinion 106 for transferring torque to the four planetary stages 118, 122, 126, 130.

With reference to FIG. 5, the first stage ring gear 134 has an annular portion 154 and an arm 158 extending therefrom. The annular portion 154 includes a plurality of teeth 162 (FIG. 5) on an inner circumferential surface of the ring gear 134 that are meshed with teeth of the first stage planet gears 146. During a portion of each fastener driving cycle, torque from the motor 42 is redirected from the drive gear 138, causing the first stage ring gear 134 to rotate relative to the first stage planet gears 146, as further discussed below.

With reference to FIG. 4, the second planetary stage 122 includes a plurality of second stage planet gears 166, a second stage carrier 170, and a second stage ring gear 174. In the illustrated embodiment, the second stage planet gears 166 include four planet gears 166. The second stage carrier 170 includes a sun gear 178 extending from the front of the carrier 170. In addition, a plurality of axles (not shown) extend from the rear of the carrier 170 upon which third stage planet gears 182 are rotatably supported. The second planetary stage 122 is positioned downstream of the first planetary stage 118 to receive torque from the first planetary stage 118.

With continued reference to FIG. 4, the third planetary stage 126 includes a plurality of third stage planet gears 182, a third stage carrier 186, and a third stage ring gear 190. In the illustrated embodiment, the third stage planet gears 182 include three planet gears 182. The third stage carrier 186 includes a sun gear 194 extending from the front of the carrier 186. In addition, a plurality of axles (not shown) extend from the rear of the carrier 186 upon which fourth stage planet gears 202 are rotatably supported. The third planetary stage 126 is positioned downstream of the second planetary stage 122 to receive torque from the second planetary stage 122.

The fourth planetary stage 130 includes a plurality of fourth stage planet gears 202 and the third stage ring gear 190. In the illustrated embodiment, the fourth stage planet gears 202 include two planet gears 202. The fourth stage planet gears 202 are directly meshed to a pinion 206 coupled to an output 142 of the brake mechanism 110. The fourth planetary stage 130 is positioned downstream of the third planetary stage 126 to receive torque from the third planetary stage 126.

With reference to FIG. 4, the brake mechanism 110 includes the output 142, a plate 210, a spring (not shown), and an electromagnet 214 (e.g., electromagnetic coil). The output 142 extends from a rear of the plate 210 such that the output 142 and the plate 210 are integrally formed. Therefore, the output 142, the plate 210, and the pinion 206 of the fourth planetary stage 130 co-rotate together. The spring biases the plate 210 and the output 142 away from the electromagnet 214. In the illustrated embodiment, the frame 70 is configured to support the brake mechanism 110 (FIG. 2).

When the electromagnet 214 is activated, the plate 210, the output 142, and pinion 206 are pulled upward (from the frame of reference of FIG. 4), against the bias of the spring, such that a front of the plate 210 engages the frame 70 or a friction plate (not shown) secured to the frame 70 to apply a frictional resistance to rotation of the plate 210, the output 142, and the pinion 206, therefore braking rotation of these components. Thus, rotation of the gears 146, 166, 182, 202 of the planetary stages 118, 122, 126, 130 is also braked. Specifically, the brake mechanism 110 prevents the rotation of the fourth stage planet gears 202 meshed with the pinion 206 when the electromagnet 214 is activated, thereby inhibiting the transfer of torque successively throughout the planetary stages 118, 122, 126, 130 from the fourth stage 130 to the first stage 118.

With reference to FIGS. 2 and 3, the lifter assembly 62 includes an offset gear 218, a rotary lifter 222, and a shaft 226 (FIG. 5) coupling the offset gear 218 and the rotary lifter 222 for co-rotation. The offset gear 218 is enmeshed with the drive gear 138 of the second gear train 102, thus receiving torque from the drive gear 138 when it rotates. The lifter 222 may be coupled for co-rotation with the shaft 226 in any of a number of different ways (e.g., by using a key and keyway arrangement, an interference fit, a spline-fit, etc.). The shaft 226 is rotatably supported by the arm 158 of the ring gear 134 and a second arm 230. In the illustrated embodiment, the second arm 230 is positioned between the brake mechanism 110 and the fourth planetary stage 130, and is pivotably supported by a bearing 232 mounted in the frame 70 (FIG. 4).

Figure 6:
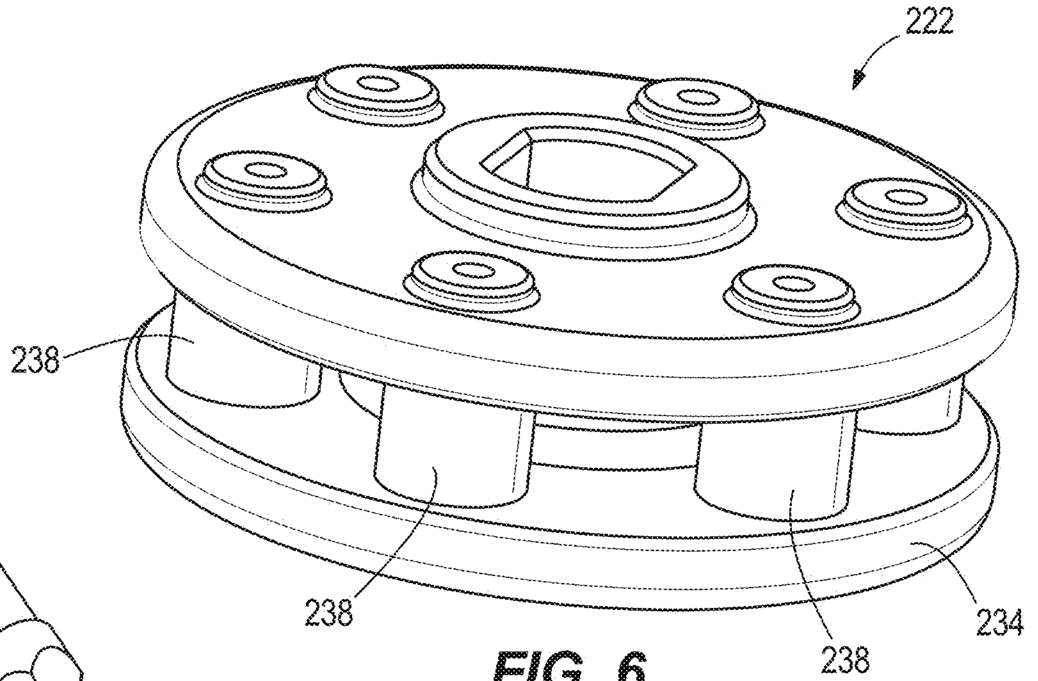
FIG. 6 is a perspective view of a rotary lifter of the lifter assembly of FIG. 2.

With reference to FIG. 6, the lifter 222 includes a body 234 and a plurality of pins 238 that sequentially engage the lift teeth 94 formed on the driver blade 26 as the driver blade 26 is returned from the driven position toward the ready position. As such, torque from the motor 42 is transferred through the first gear train 100 and through the first stage 118 of the second gear train 102, to the offset gear 218, and subsequently to the lifter 222, which engages the driver blade 26. Specifically, the pins 238 of the lifter 222 sequentially engage the corresponding lift teeth 94 to move the driver blade 26 from the driven position toward the ready position.

With reference to FIGS. 3 and 4, the lifter assembly 62 is pivotable between an engaged position, in which the rotary lifter 222 is engageable with the driver blade 26 to return the driver blade 26 from the driven position toward the ready position, and a bypass position in which the lifter assembly 62 is pivoted about a pivot axis 242 (FIG. 4) coaxial with the input pinion 106 of the second gear train 102 away from the driver blade 26. While the bypass position does not coincide with a single discrete position of the lifter assembly 62 about the pivot axis 242, the lifter assembly 62 reaches the bypass position when the rotary lifter 222 is no longer engageable with the driver blade 26. The lifter assembly 62 is biased by a spring (not shown) to return the lifter assembly 62 toward the engaged position.

The powered fastener driver 10 further includes a controller (e.g., a printed circuit board having one or more microprocessors). The controller is configured to activate and deactivate the motor 42 during operation of the fastener driver 10. Specifically, the controller may be electrically connected to one or more sensors for determining, based on an output of the one or more sensors, when to drive the motor 42. For example, the lifter assembly 62 may include a sensor, such as a Hall-effect sensor operable to detect a magnet positioned on the lifter 222. When the Hall-effect sensor detects the magnet, the sensor indicates to the controller a rotational position of the lifter 222, which may correlate to the ready position of the driver blade 26. The driver blade 26 may also include an onboard magnet (not shown) that is detectable by another Hall-effect sensor (also not shown) in communication with the controller, for example, when the driver blade 26 is in the driven position.

The brake mechanism 110 is electrically connected to the controller. The motor 42 is configured to rotate continuously in one direction (e.g., forward direction) during a driving cycle. The brake mechanism 110 is selectively activated by the controller to redirect the torque from the motor 42 away from the lifter 222 for adjusting the lifter assembly 62 from the engaged position toward the bypass position, as further discussed below.

The trigger 66 is also electrically connected to the controller such that activation of the trigger 66 to initiate a driving cycle may also initiate a timing sequence. In particular, in response to depressing the trigger 66, the controller activates the motor 42 and initiates a timer to determine whether, at the expiration of the timer, the driver blade 26 has reached the driven position. Upon the driver blade 26 reaching the driven position, the controller continues driving the motor 42 to return the driver blade 26 from the driven position to the ready position. The one or more sensors may be configured to indicate to the controller when the driver blade 26 has reached the ready position.

During a normal driving cycle in which a fastener is discharged into a workpiece, the lifter assembly 62 returns the piston and the driver blade 26 from the driven position to the ready position. As the piston and the driver blade 26 are returned to the ready position, the gas within the cylinder 18 above the piston is compressed. Once in the ready position, the piston and the driver blade 26 are held in position until released by user activation of the trigger 66 (FIG. 1), which initiates a driving cycle. When released, the compressed gas above the piston within the cylinder 18 drives the piston and the driver blade 26 to the driven position, thereby driving a fastener into a workpiece. The illustrated fastener driver 10 therefore operates on a gas spring principle utilizing the lifter assembly 62 and the piston to compress the gas within the cylinder 18 upon being returned to the ready position for a subsequent fastener driving cycle. The ready position may be when the piston and the driver blade 26 is at the TDC position. In alternative embodiments, the ready position may be when the piston and the driver blade 26 is near the TDC position (e.g., 80 percent of the way up the cylinder 18) such that the compressed air is partially compressed.

More specifically, when the trigger 66 is actuated and the piston and the driver blade 26 are at the ready position, the controller activates the motor 42 and the brake mechanism 110. The motor 42 supplies torque to the first gear train 100 and the second gear train 102. Activation of the brake mechanism 110, however, prevents the transfer of torque through the last three stages 122, 126, 130 of the second gear train 102 such that the planetary gears 146, 166, 182, 202 of all the stages 118, 122, 126, 130 and the drive gear 138 remain stationary, and the torque is redirected toward the first stage ring gear 134. Specifically, when the brake mechanism 110 is activated, the electromagnet 214 is energized and the plate 210, the output 142, and the pinion 206 are pulled upward (from the frame of reference of FIG. 4), against the bias of the spring, such that a front of the plate 210 engages the frame 70 or the friction plate (not shown), applying a frictional resistance and thereby inhibiting rotation of the plate 210, the output 142, and the pinion 206. As such, rotation of the planetary gears 146, 166, 182, 202 of all the stages 118, 122, 126, 130 and the drive gear 138 is inhibited and the first stage ring gear 134 rotates (counterclockwise from the frame of reference of FIG. 2) relative to the stationary first stage planetary gears 146 to move or pivot the lifter assembly 62, including the arm 158, toward the bypass position. Thereafter, the lifter 222 no longer engages the driver blade 26, and the piston and the driver blade 26 are thrust downward toward the driven position by the compressed air in the cylinder 18 above the piston. As the driver blade 26 is displaced toward the driven position, the motor 42 and the brake mechanism 110 remain activated to continue redirection of the torque away from the lifter 222 toward the first stage ring gear 134, maintaining the lifter assembly 62 in the bypass position. In some embodiments, the lifter assembly 62 may raise the driver blade 26 past the ready position toward the TDC position (after the trigger 66 is actuated) before the lifter assembly 62 is moved to the bypass position.

Upon a fastener being driven into a workpiece, the driver blade 26 is in the driven or BDC position. As the driver blade 26 reaches the driven position, the one or more sensors indicate to the controller that the driver blade 26 has successfully reached the driven position. As such, the controller continues driving of the motor 42 and deactivates the brake mechanism 110, allowing the lifter assembly 62 to move toward the engaged position by the bias of the spring. Deactivation of the brake mechanism 110 allows the transfer of torque through the second gear train 102 to resume. As such, the second stage, third stage, and fourth stage planetary gears 166, 182, 202 freely spin (clockwise from the frame of reference of FIG. 3), and the first stage ring gear 134 is stationary. The drive gear 138 receives the torque from the motor 42 to rotate the offset gear 218, and consequently to rotate the lifter 222. Subsequently, a first of the pins 238 on the lifter 222 engages an uppermost one of the lift teeth 94 on the driver blade 26, and continued driving of the motor 42 rotates the lifter 222, which returns the driver blade 26 and the piston toward the ready position. In some embodiments, one complete rotation of the lifter 222 is necessary to return the driver blade 26 from the driven position to the ready position.

During a fastener driving cycle, the driver blade 26 may stop at an intermediate position between the ready position and the driven position as a result of a fastener jamming within the driver 10. The one or more sensors determine if the driver blade 26 stops at the intermediate position if the driver blade 26 isn't detected at the ready position at the expiration of the abovementioned timer, at which time the controller implements an error correction mode to allow the user to clear the jammed fastener and to return the driver blade 26 to its ready position for a subsequent fastener driving operation. With the driver blade 26 is in the intermediate position, the pins 238 on the lifter 222 may be blocked by the lift teeth 94, depending on the exact position at which the driver blade 26 stops. In other words, the driver blade 26 may stop at the intermediate position in which the lift teeth 94 are blocking the pins 238 from reentering the space between the lift teeth 94.

In particular, when the driver blade 26 stops at the intermediate position and the controller implements the error correction mode, the controller energizes a solenoid of a driver blade latch mechanism (not shown), thereby moving a latch to engage one of a plurality of latch teeth on the driver blade 26 opposite the lift teeth 94. As such, the latch holds the driver blade 26 and prevents movement of the driver blade 26 toward the driven position, thereby inhibiting unintentional firing of the fastener driver 10 when a fastener jamming occurs. The controller continues to drive the motor 42 such that the lifter 222 continues to rotate. Continued rotation of the lifter 222 allows the pins 238 to reenter the space between the lift teeth 94. Should the lift teeth 94 block the pins 238 from reentering the space between the lift teeth 94, the lifter assembly 62 is pivotable away from the driver blade 26 toward the bypass position by the continued rotation of the lifter 222 such that lifter assembly 62 pivots slightly away from the driver blade 26 against the bias of the spring to overcome the jam. Thereafter, the pins 238 are aligned with the space between the lift teeth 94 and the spring pivots the lifter assembly 62 toward the engaged position. Subsequently, the lifter 222 returns the driver blade 26 to the ready position from the intermediate position. Once the one or more sensors indicate to the controller that the driver blade 26 has reached the ready position, the controller deactivates the motor 42 and the latch solenoid, and the fastener driver 10 is ready for a subsequent fastener driving cycle.

The lifter assembly 62 is operable to automatically overcome a jam when the lifter assembly 62 is lifting the driver blade 26 from the driven position to the ready position.

Figure 8:
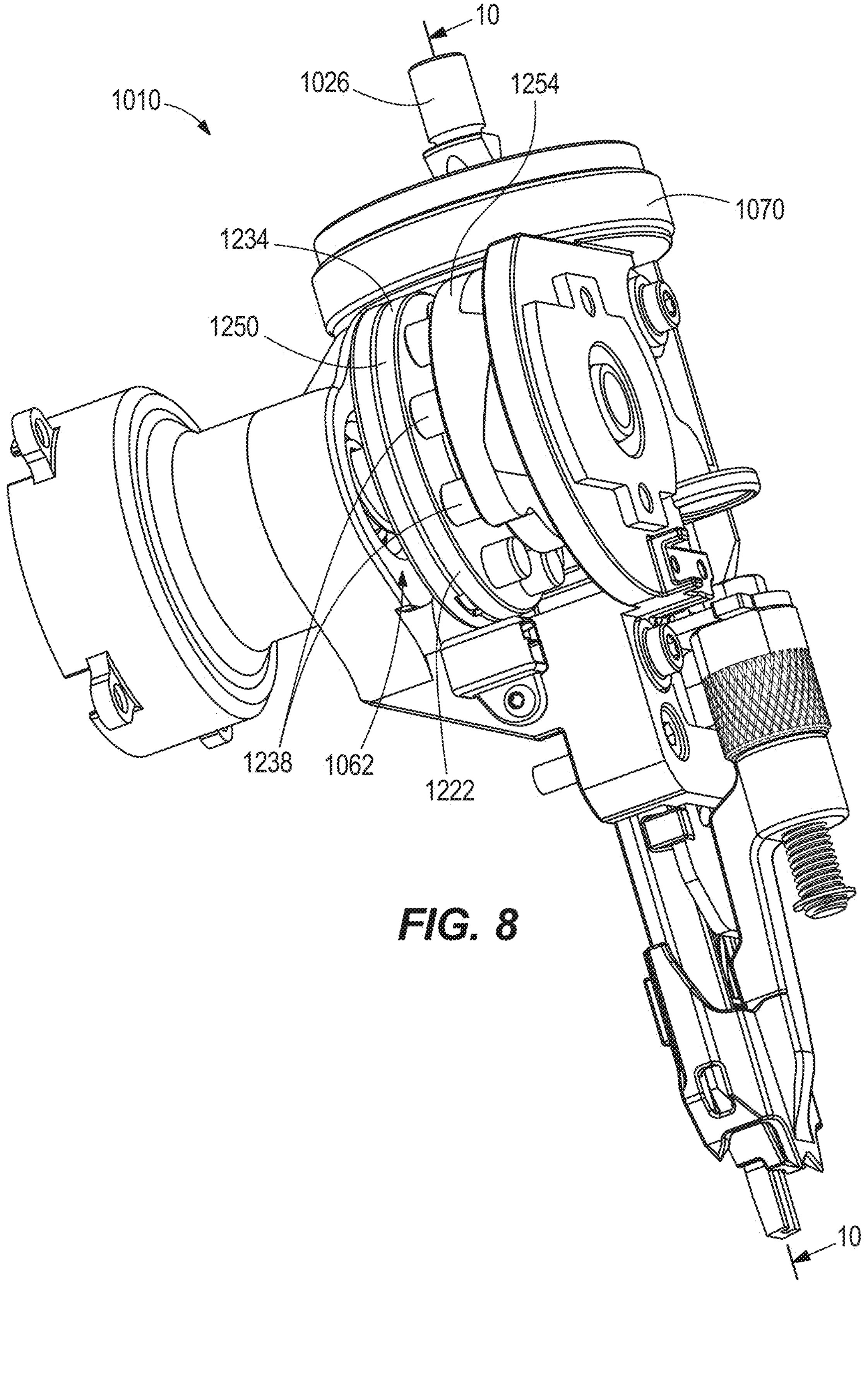
FIG. 8 is a perspective view of another embodiment of a powered fastener driver including a lifter assembly.
Figure 10:
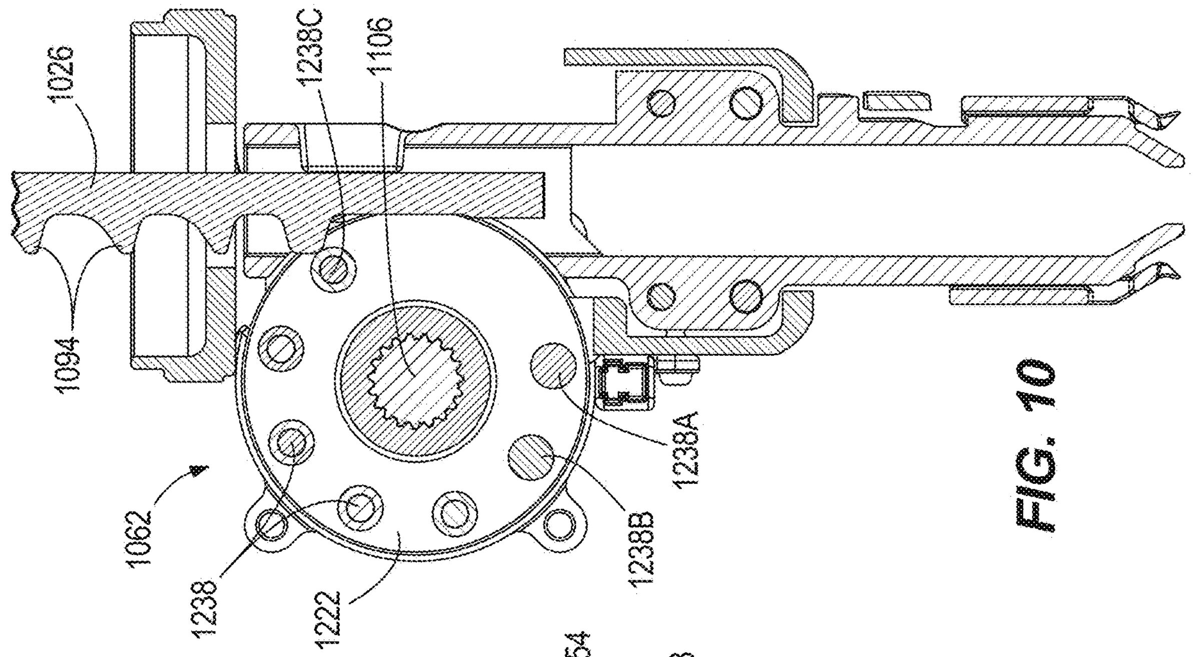
FIG. 10 is a front cross-sectional view of the lifter assembly of FIG. 8 taken along 10-10 shown in FIG. 8, illustrating a driver blade of the lifter assembly in a ready position.

FIG. 8 illustrates a portion of another embodiment of a fastener driver 1010 and a lifter assembly 1062, with like components and features as the embodiment of the fastener driver 10 and lifter assembly 62 shown in FIGS. 1-7 being labeled with like reference numerals plus "1000". The lifter assembly 1062 is powered by a motor 1042 (FIG. 1) and is operable to return a driver blade 1026 from the driven position (FIG. 12) to the ready position (FIG. 10) during each fastener driving cycle. If a fastener becomes jammed during a driving cycle, the driver blade 1026 may stop at an intermediate position between the driven position and the ready position. Like the lifter assembly 62 described above, the lifter assembly 1062 is also operable to return the driver blade 1026 from the intermediate position to the ready position, thereby resetting the fastener driver 1010 for a subsequent fastener driving cycle.

Figure 9B:
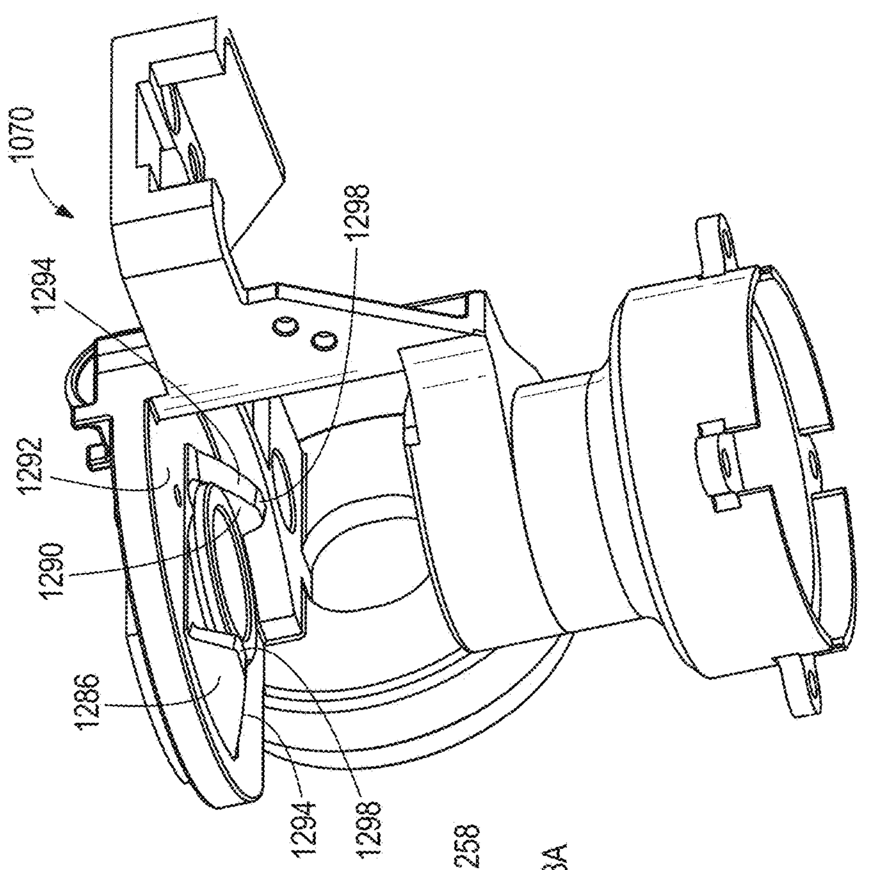
FIG. 9B is a perspective view of a frame of the portion of the fastener driver shown in FIG. 8.
Figure 9A:
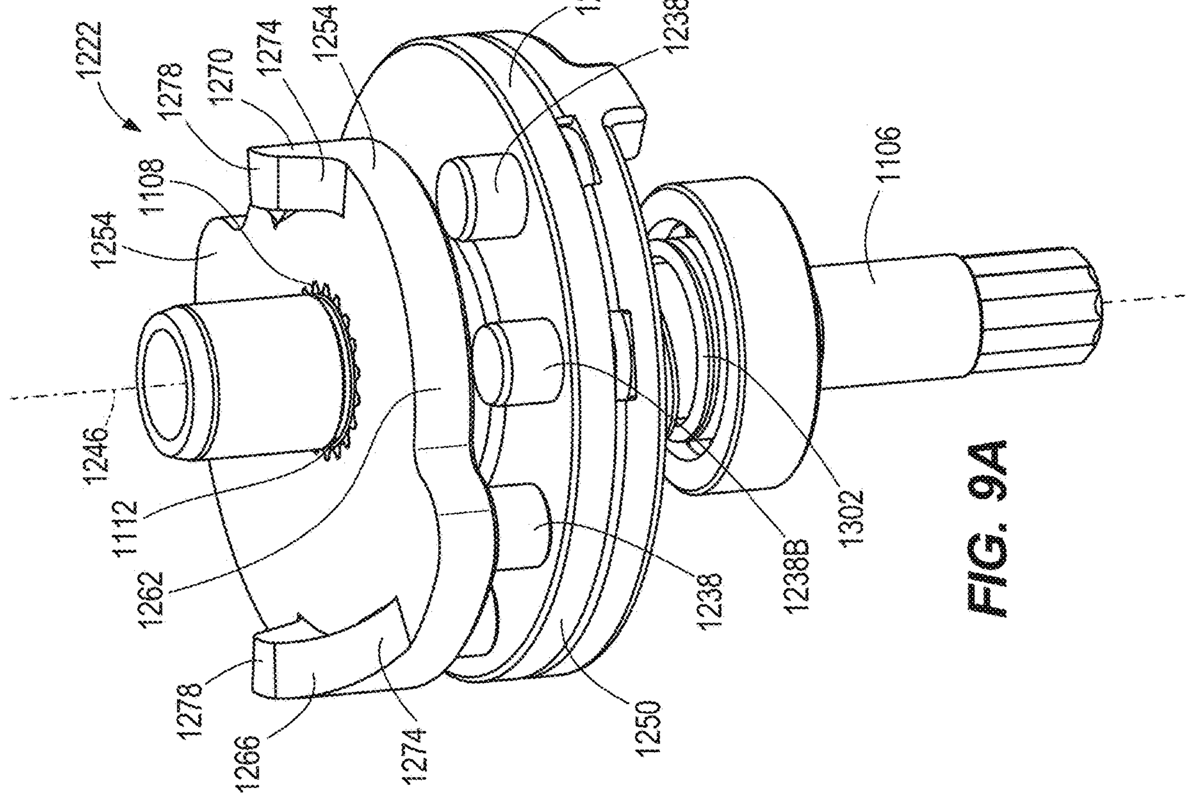
FIG. 9A is a perspective view of a rotary lifter of the lifter assembly of FIG. 8.

With reference to FIG. 9A, the lifter assembly 1062 includes a rotary lifter 1222 coupled for co-rotation with an output shaft 1106 of the gear train 1100 (FIG. 1). In the illustrated embodiment, the output shaft 1106 includes external splines 1108 extending along the length of the output shaft 1106 and the rotary lifter 1222 includes a bore defining internal splines 1112 mated with the external splines on the output shaft 1106. As such, the rotary lifter 1222 receives torque from the output shaft 1106 when the shaft 1106 rotates about its rotational axis 1246. However, the mated splines do not axially constrain the rotary lifter 1222 on the output shaft 1106.

With reference to FIGS. 8 and 9A, the rotary lifter 1222 includes a body 1234 and a plurality of pins 1238 that sequentially engage lift teeth 1094 (FIG. 10) formed on the driver blade 1026 as the driver blade 1026 is returned from the driven position toward the ready position. As such, torque from the motor 1042 is transferred through the gear train 1100 and subsequently to the lifter 1222, which engages the driver blade 1026. Specifically, the pins 1238 of the lifter 1222 sequentially engage the corresponding lift teeth 1094 to move the driver blade 1026 from the driven position toward the ready position.

With reference to FIG. 9A, the body 1134 of the lifter 1222 includes a first flange 1250 and a second flange 1254 parallel with the first flange 1250. The pins 1238 extend between the flanges 1250, 1254. While the first flange 1250 is generally circular, the second flange 1254 has a recess 1262 in its outer peripheral surface, thereby exposing an axial face portion 1258 of the first flange 1250. A first pin 1238A and a second pin 1238B of the plurality of pins 1238 are positioned on the axial face portion 1258, with the distal ends of the respective pins 1238A, 1238B being exposed.

With continued reference to FIG. 9A, the second flange 1254 includes a first cam portion 1266 and a second cam portion 1270 that extend from the second flange 1254 away from the first flange 1250. The first and second cam portions 1266, 1270 are positioned opposite each other with the rotational axis 1246 therebetween. But, relative to the rotational axis 1246, the first cam portion 1266 is spaced farther in a radially outward direction on the second flange 1254 than the second cam portion 1270. Each of the first and second cam portions 1266, 1270 includes a first surface 1274 that is inclined relative to the rotational axis 1246 and an adjacent second surface 1278 that is perpendicular to the rotational axis 1246. The second surfaces 1278 are hereinafter referred to as landing surfaces 1278.

With reference to FIG. 9B, the frame 1070 includes a third cam portion 1286 and a fourth cam portion 1290 extending toward the rotary lifter 1222. Like the first and second cam portions 1266, 1270, the third and fourth cam portions 1286, 1290 are positioned opposite each other with the rotational axis 1246 therebetween. But, relative to the rotational axis 1246, the third cam portion 1286 is spaced farther in a radially outward direction than the fourth cam portion 1290. Also, each of the third and fourth cam portions 1286, 1290 includes a first surface 1294 that is inclined relative to the rotational axis 1246 and an adjacent second surface 1298 that is perpendicular to the rotational axis 1246. The second surfaces 1298 may be defined as landing surfaces 1298. The inclined surfaces 1294 of the third and fourth cam portions 1286, 1290 are engageable with the inclined surfaces 1274 of the first and second cam portions 1266, 1270, respectively. And, the landing surfaces 1298 of the third and fourth cam portions 1286, 1290 are engageable with the landing surfaces 1278 of the first and second cam portions 1266, 1270, respectively.

With reference to FIG. 9A, the lifter assembly 1062 further includes a spring 1302 for biasing the lifter 1222 along the rotational axis 1246 toward an interior surface 1292 of the frame 1070 from which the cam portions 1286, 1290 project (FIG. 9B) to position the lifter 1222 in an engaged position in which the pins 1238 on the rotary lifter

Figure 11:
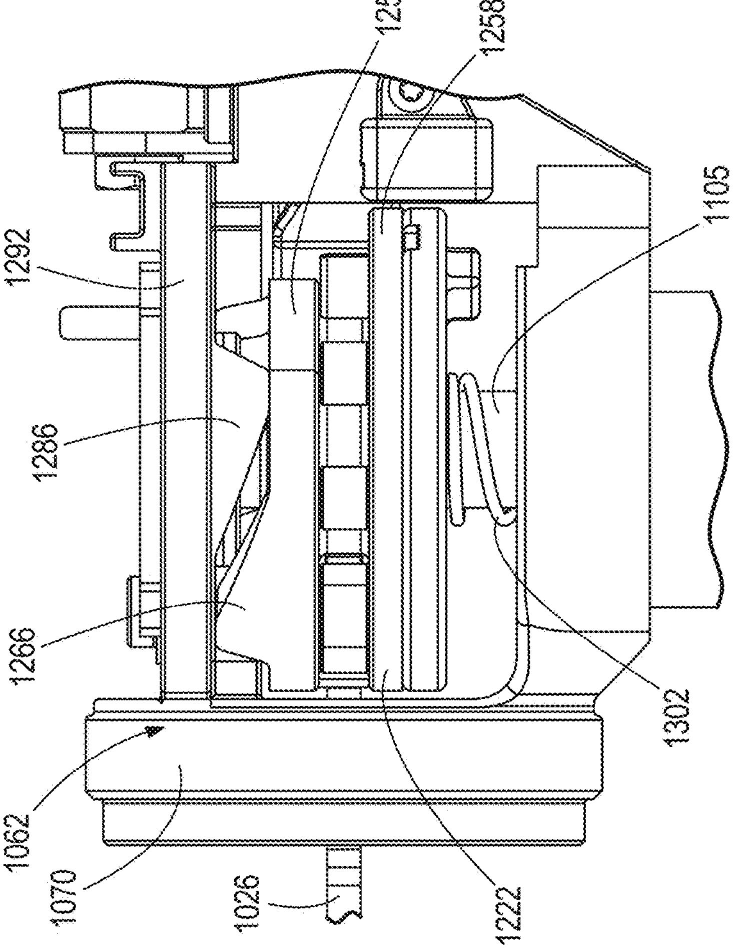
FIG. 11 is a side view of the lifter assembly of FIG. 8 illustrating the rotary lifter in an engaged position.
Figure 15:
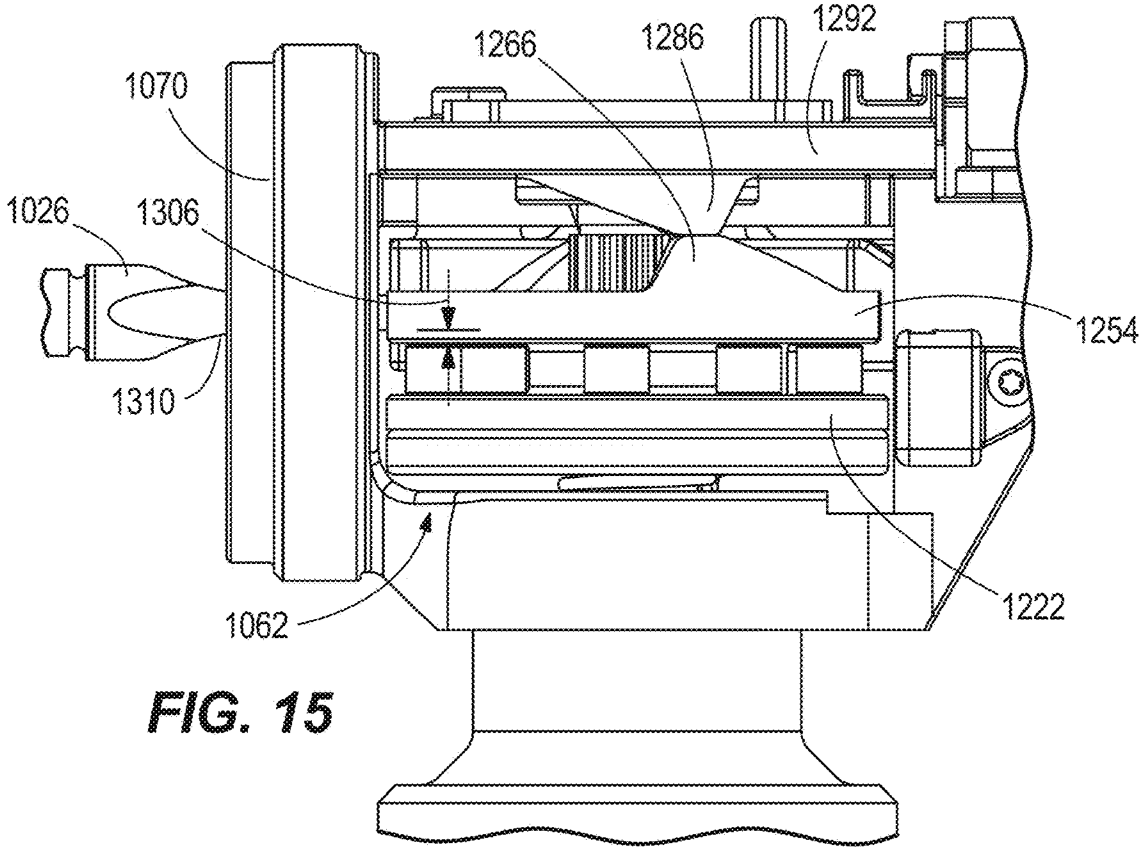
FIG. 15 is another side view of the lifter assembly of FIG. 8 illustrating the rotary lifter in the bypass position.

1222 are engageable with the corresponding teeth 1094 on the driver blade 1026 (FIG. 11). Engagement between the first and second cam portions 1266, 1270, and the third and fourth cam portions 1286, 1290, respectively, by rotation of the lifter 1222 axially moves the lifter 1222 on the output shaft 1106, along the rotational axis 1246, away from the interior surface 1292 of the frame 1070 against the bias of the spring 1302 (thus away from the engaged position of the lifter 1222). In particular, the axial movement of the lifter 1222 away from the engaged position also moves the pins 1238 "out of plane" with the driver blade 1026 where, when the landing surfaces 1278, 1298 of the respective cam portions 1266, 1270, 1286, 1290 are engaged, a gap 1306 is created between a rear surface 1310 of the driver blade 1026 and the distal ends of the respective pins 1238A, 1238B (FIG. 15). When the lifter 1222 is moved a sufficient distance to create the gap 1306, the lifter 1222 is located in a bypass position.

During a normal driving cycle in which a fastener is discharged into a workpiece, the lifter 1222 returns the piston and the driver blade 1026 from the driven position to the ready position. Once in the ready position (e.g., FIG. 10), the piston and the driver blade 1026 are held until released by user activation of a trigger 1066 (FIG. 1), which initiates a driving cycle. When released, the compressed gas above the piston drives the piston and the driver blade 1026 toward the driven position (FIG. 12), thereby driving a fastener into a workpiece. The piston and driver blade 1026 are then returned again toward the ready position, which is near a true TDC position of the piston and driver blade 1026.

Prior to initiation of a fastener driving cycle, the inclined surfaces 1274 of the first and second cam portions 1266, 1270 are spaced circumferentially from the inclined surfaces 1294 of the third and fourth cam surface 1286, 1290, as shown in FIG. 11. When the trigger 1066 is actuated and the piston and the driver blade 1026 are at the ready position, the controller activates the motor 1042. The motor 1042 supplies torque to the gear train 1100 and begins rotating the lifter 1222. After a small amount of rotation, the pin 1238C of the lifter 1222 disengages the lowermost tooth 1094 on the driver blade 1026, and the piston and the driver blade 1026 are thrust downward toward the driven position by the compressed air above the piston. In some embodiments, the lifter 1222 may raise the driver blade 1026 past the ready position toward the TDC position before the driver blade 1026 is driven toward the driven position.

Figure 12:
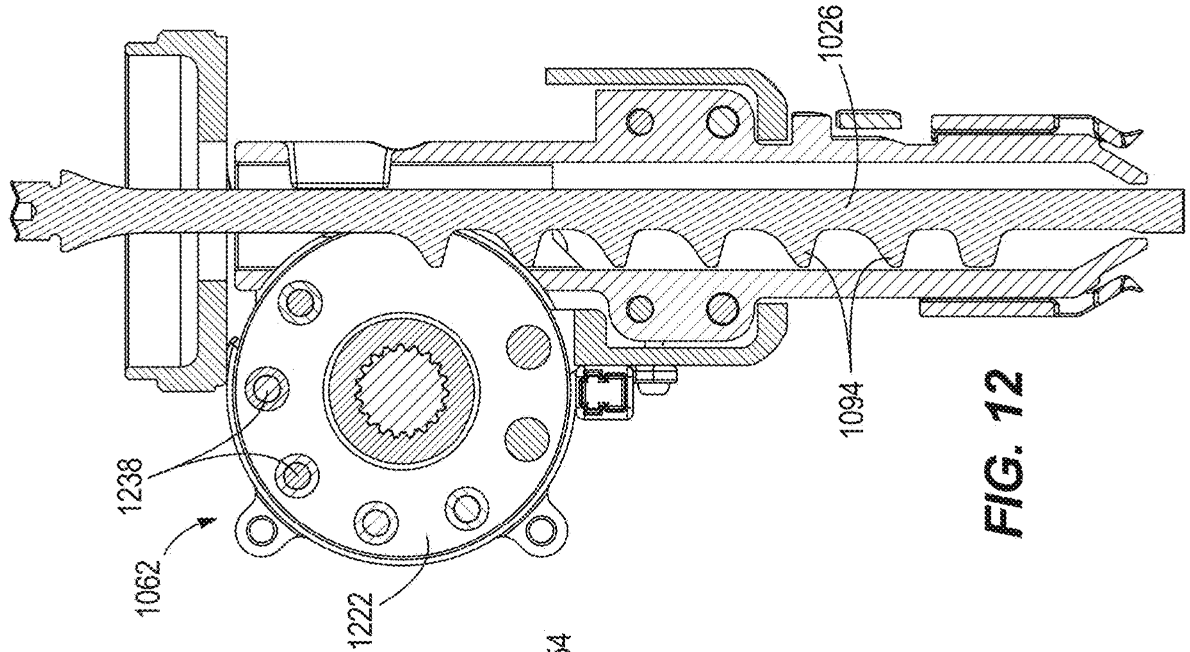
FIG. 12 is another front cross-sectional view of the lifter assembly of FIG. 8 illustrating the driver blade in a driven position.
Figure 13:
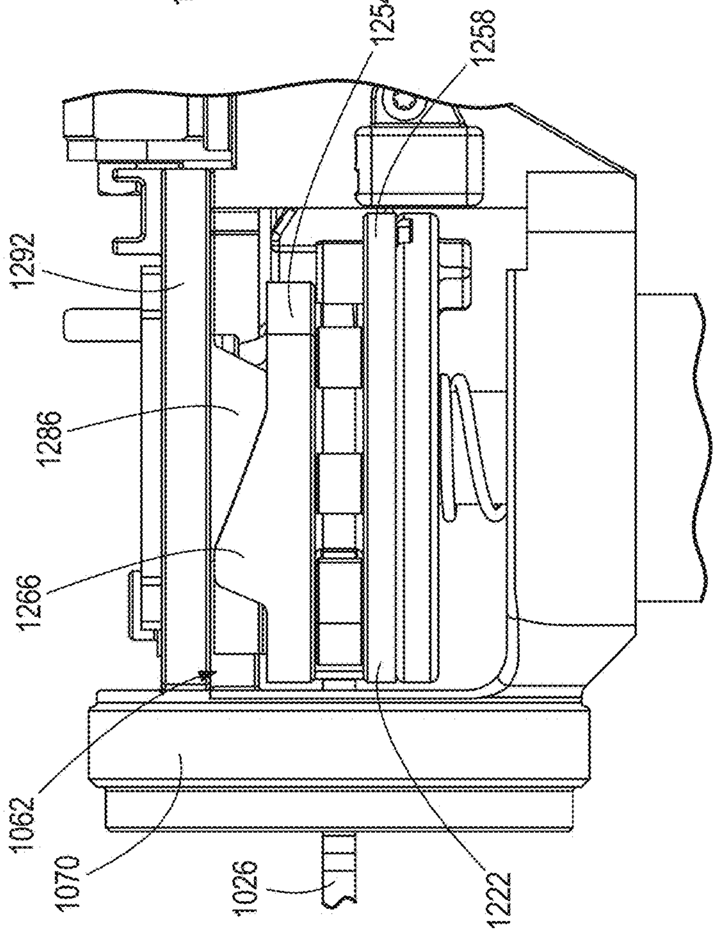
FIG. 13 is another side view of the lifter assembly of FIG. 8 illustrating the rotary lifter when the driver blade is in the position of FIG. 11.
Figure 14:
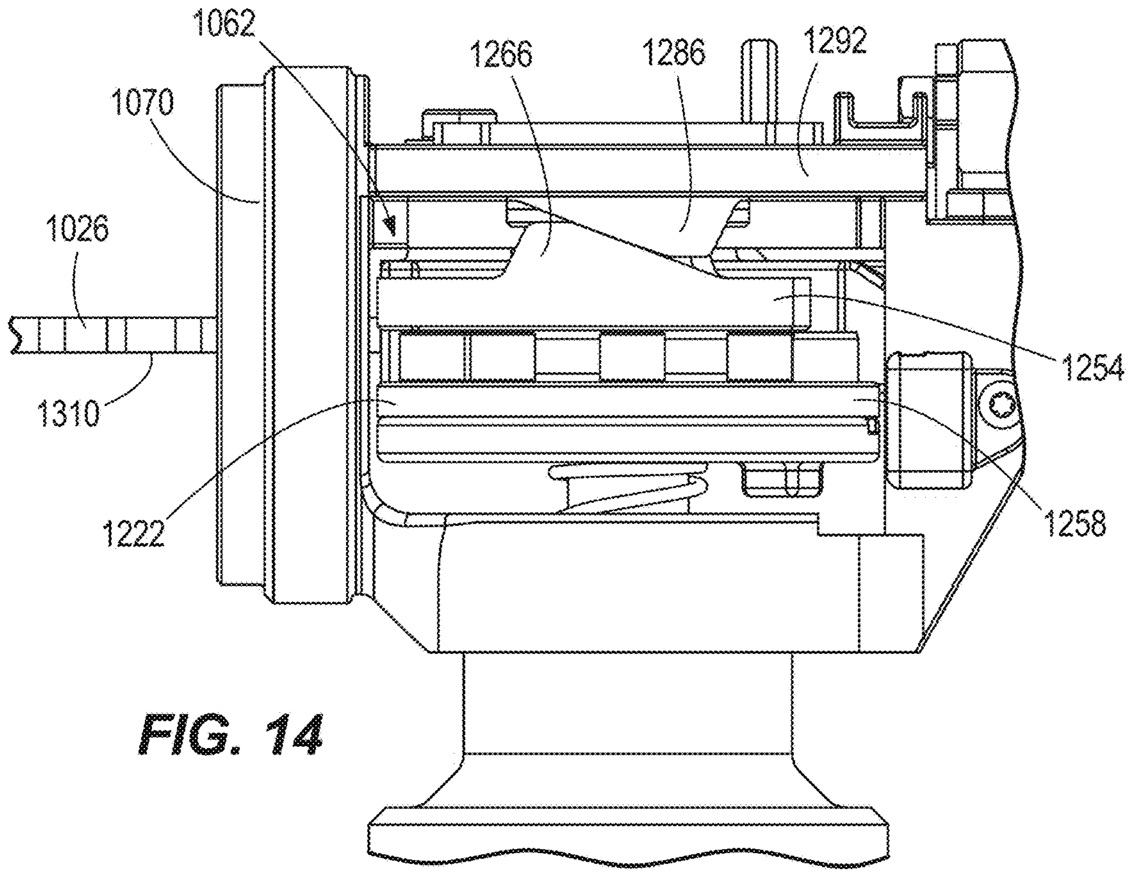
FIG. 14 is another side view of the lifter assembly of FIG. 8 illustrating the rotary lifter being moved from the engaged position, as shown in FIG. 11, toward a bypass position.

After driving a fastener into a workpiece, the driver blade 1026 is in the driven or BDC position (FIG. 12). After the driver blade 1026 reaches the driven position, the inclined surfaces 1274 of the first and second cam portions 1266, 1270 engage the inclined surfaces 1294 of the third and fourth cam surface 1286, 1290, as shown in FIG. 13. Continued rotation of the lifter 1222 causes the inclined surfaces 1274 of the first and second cam portions 1266, 1270 to slide along the inclined surfaces 1294 of the third and fourth cam portions 1286, 1290 (FIG. 14), thereby translating the lifter 1222 against the bias of the spring 1302 along the rotational axis 1246 away from the engaged position and toward the bypass position. The lifter 1222 continues translating (as well as rotating) until the landing surfaces 1278 of the first and second cam portions 1266, 1270 reach the landing surfaces 1298 of the third and fourth cam portions 1286, 1290, respectively (FIG. 15). Thereafter, the lifter 1222 stops translating, at which time the first pin 1238A has been moved out of plane with the driver blade 1026. The lifter 1222 is at the bypass position (i.e., the farthest axial position from the driver blade 1026) when the landing surfaces 1278 of the first and second cam portions 1266, 1270 are in sliding contact with the landing surfaces 1298 of the third and fourth cam portions 1286, 1290, respectively (FIG. 15).

Figure 16:
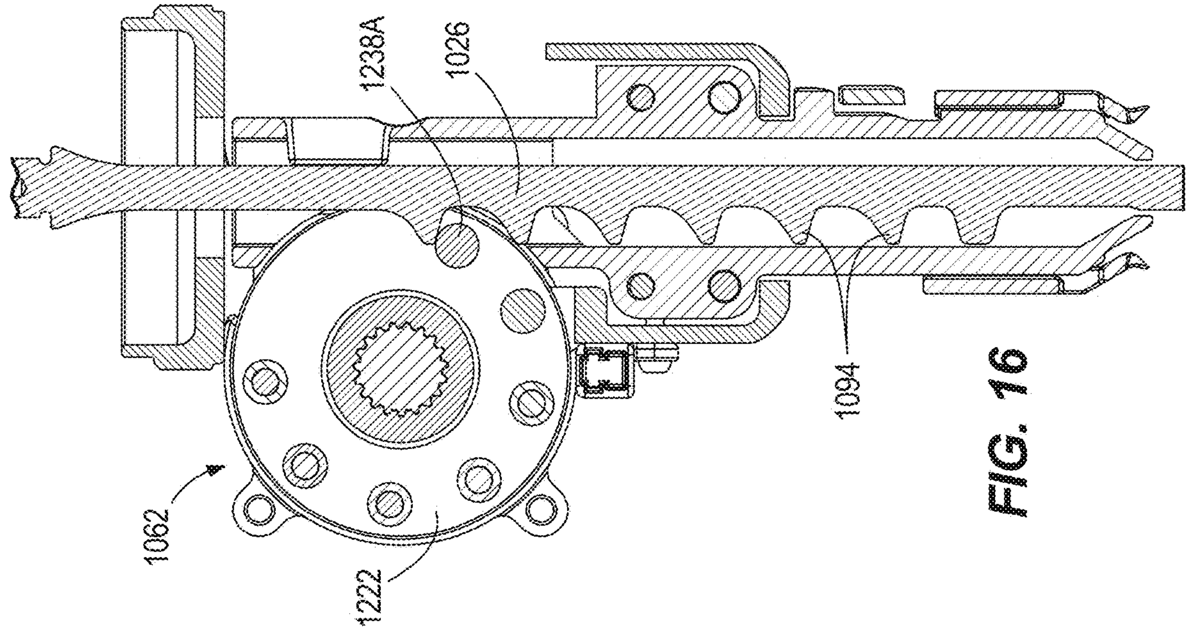
FIG. 16 is another front cross-sectional view of the lifter assembly of FIG. 8 illustrating the driver blade in the driven position and the rotary lifter engaging the driver blade to begin returning the driver blade toward the ready position of FIG. 10.
Figure 17:
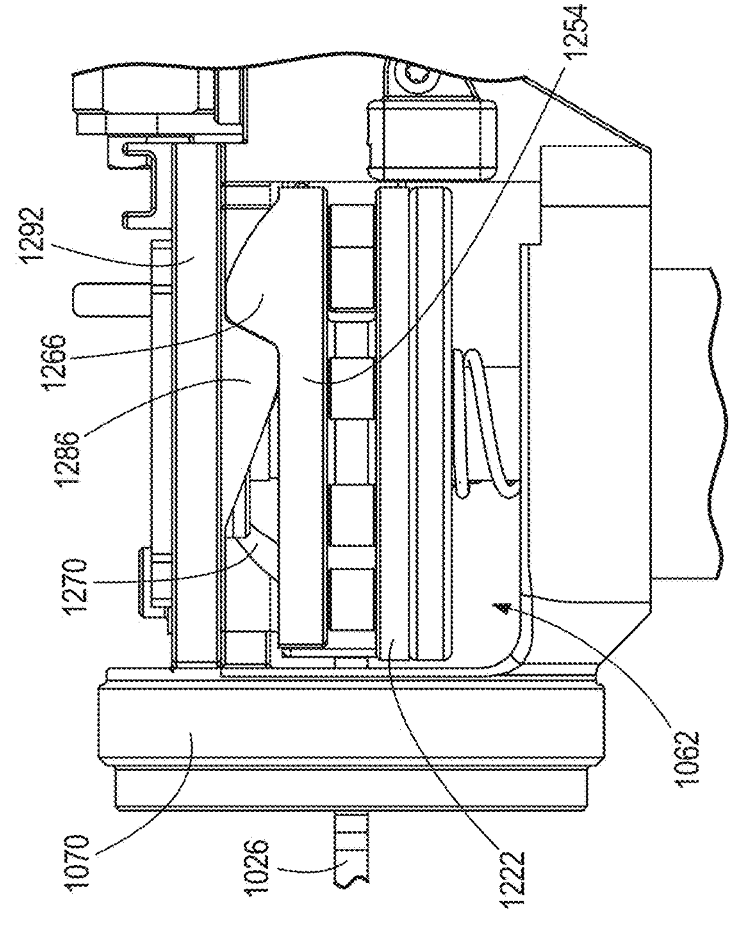
FIG. 17 is another side view of the lifter assembly of FIG. 8 illustrating the rotary lifter when the lifter is in the position of FIG. 16.

Continued activation of the motor 1042 continues to rotate the lifter 1222 such that the landing surfaces 1278 of the first and second cam portions 1266, 1270 move circumferentially past the landing surfaces 1298 of the third and fourth cam portions 1286, 1290 respectively, as shown in FIG. 17. At this time, the spring 1302 rebounds, translating the lifter 1222 from the bypass position toward the engaged position again. Subsequently, as shown in FIG. 16, the first lifter pin 1238A on the lifter 1222 engages an uppermost one of the lift teeth 1094 on the driver blade 1026. Because the distal ends of the lifter pins 1238A, 1238B are exposed by the recess 1262 defined in the second flange 1254, the uppermost one of the lift teeth 1094 cannot contact or jam against the second flange 1254 as the lifter 1222 is moved back into the engaged position (i.e., back into plane with the driver blade 1026). Continued activation of the motor 1042 rotates the lifter 1222, which returns the driver blade 1026 and the piston toward the ready position. In some embodiments, one complete rotation of the lifter 1222 is necessary to return the driver blade 1026 from the driven position to the ready position.

In particular, the first and second cam portions 1266, 1270 (and the third and fourth cam portions 1286, 1290) are positioned at predetermined circumferential positions to reciprocate the lifter 1222 between the engaged position and the bypass position after the driver blade 1026 reaches the driven position, but before the first lifter pin 1238A engages the uppermost one of the lift teeth 1094 on the driver blade 1026 to begin returning the driver blade 1026 toward the ready position. The reciprocating lifter 1222 is moved out of plane, and then back into plane with the driver blade 1026, with every single revolution of the lifter 1222 for each fastener driving cycle.

Figure 18:
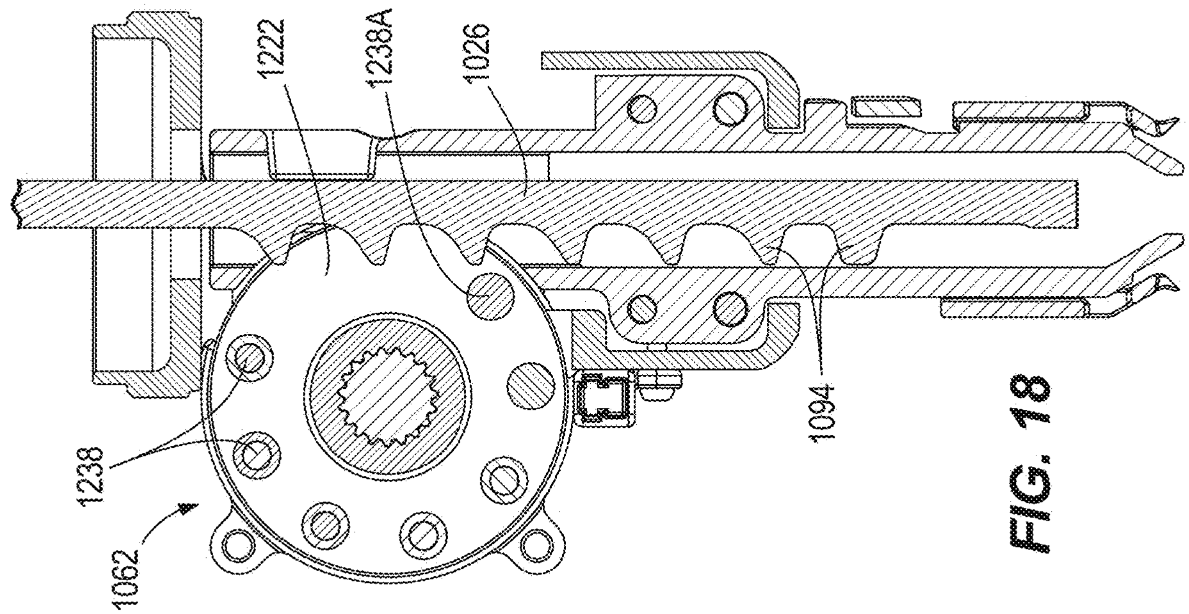
FIG. 18 is another front cross-sectional view of the lifter assembly of FIG. 8 illustrating the driver blade stopped at an intermediate position between the ready position and the driven position in response to a fastener jam.
Figure 20:
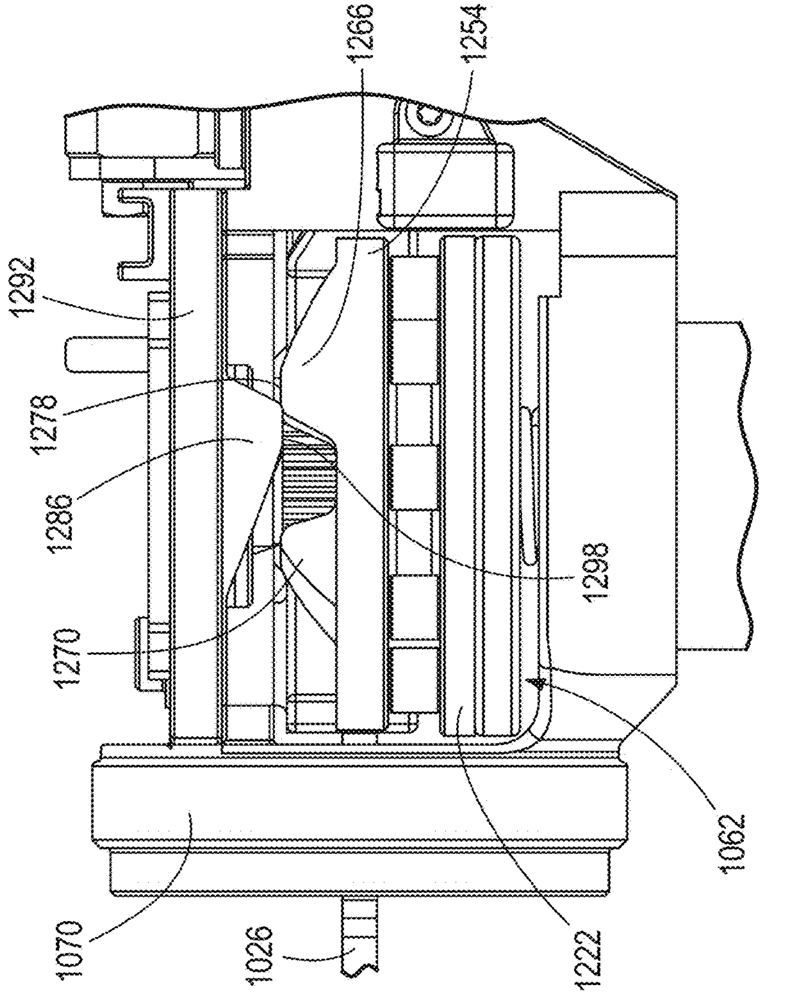
FIG. 20 is a side view of the lifter assembly of FIG. 8 illustrating the rotary lifter located between the bypass position and the engaged position, with the first lifter pin engaged with the rear surface of one of the lift teeth of the driver blade, which is stopped at the intermediate position as shown in FIGS. 18 and 19.
Figure 19:
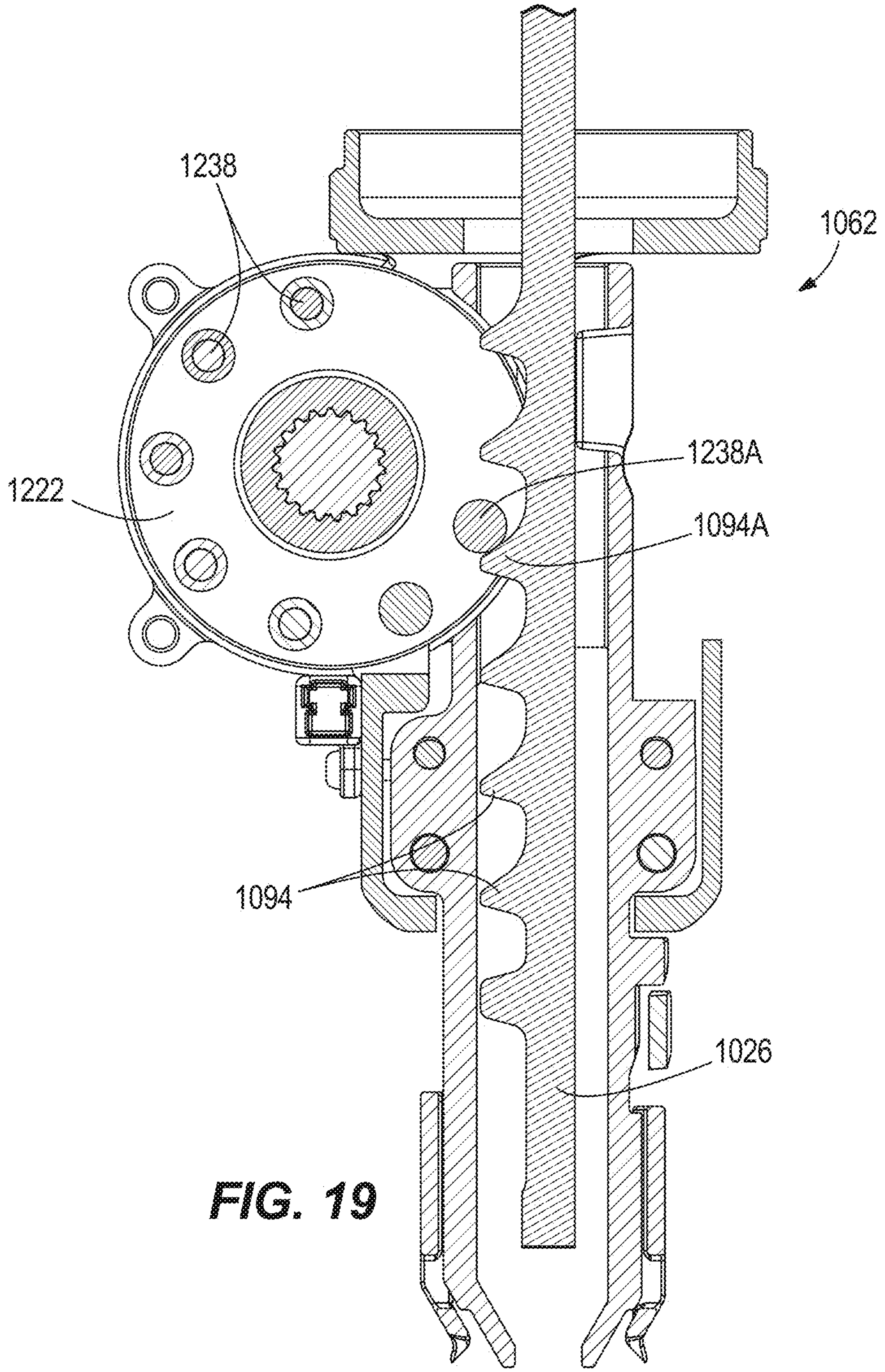
FIG. 19 is another front cross-sectional view of the lifter assembly of FIG. 8 illustrating a first lifter pin engaged with a rear surface of one of the lift teeth on the driver blade, which is stopped at the intermediate position as shown in FIG. 18.

During a fastener driving cycle, the driver blade 1026 may stop at an intermediate position (FIG. 18) between the ready position (FIG. 10) and the driven position (FIG. 12) as a result of a fastener jamming within the driver 1010. With the driver blade 1026 in the intermediate position and with the lifter 1222 in the bypass position, the first lifter pin 1238A may be blocked by one of the lift teeth 1094A (FIG. 19), depending on the exact position at which the driver blade 1026 stops. In other words, the driver blade 1026 may stop at the intermediate position in which one of the lift teeth 1094 is blocking the first lifter pin 1238A from reentering the space between adjacent lift teeth 1094. In such a situation, the lift tooth 1094A prevents the lifter 1222 from returning to the engaged position by the rebounding spring 1302. Consequently, the landing surfaces 1278 of the first and second cam portions 1266, 1270, which have moved past the landing surfaces 1298 of the third and fourth cam portions 1286, 1290 respectively, as shown in FIG. 20, are prevented from axially moving toward the interior surface 1292 of the frame 1070.

Continued rotation of the lifter 1222 moves the landing surfaces 1278 of the first and second cam portions 1266, 1270 circumferentially past the landing surfaces 1298 of the third and fourth cam portions 1286, 1290 respectively, and slides the distal end of the first lifter pin 1238A along the rear surface of the driver blade 1026 until the first lifter pin 1238A can reenter the space between adjacent lift teeth 1094. Thereafter, the spring 1302 rebounds and translates the lifter 1222 toward the engaged position (shown in FIG. 17), where the remainder of the pins 1238 are aligned with the respective spaces between the lift teeth 1094 and again moved into plane with the driver blade 1026. Subsequently, the lifter 1222 returns the driver blade 1026 to the ready position from the intermediate position. Once the one or more sensors indicate to the controller that the driver blade 1026 has reached the ready position, the controller deactivates the motor 1042 and the fastener driver 1010 is ready for a subsequent fastener driving cycle.

Figure 21:
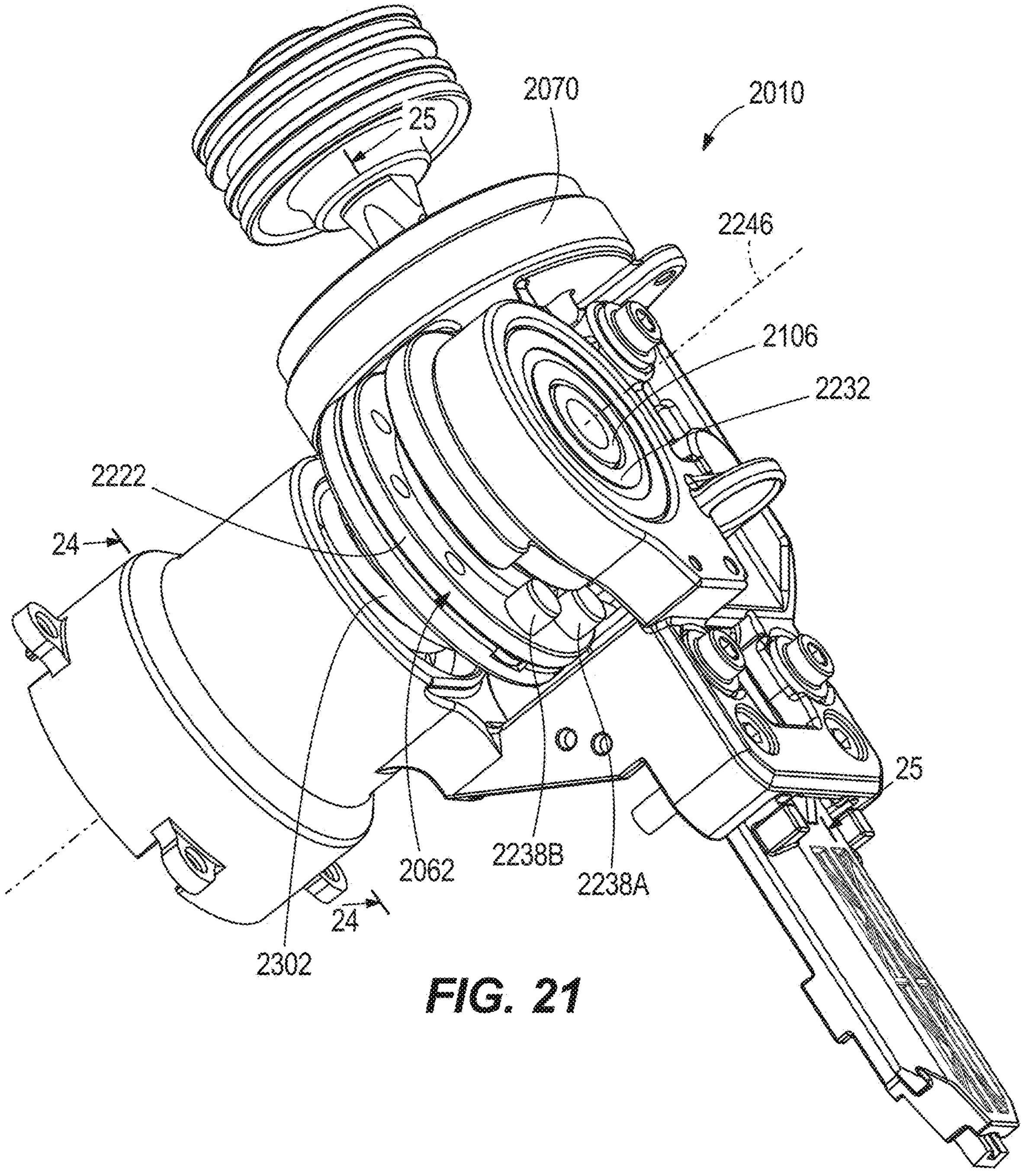
FIG. 21 is a perspective view of yet another embodiment of a powered fastener driver including a lifter assembly.

FIG. 21 illustrates a portion of another embodiment of a fastener driver 2010 and a lifter assembly 2062, with like components and features as the embodiment of the fastener driver 1010 and lifter assembly 1062 shown in FIGS. 8-20 being labeled with like reference numerals plus "1000". The lifter assembly 2062 is powered by a motor 2042 (FIG. 1) and is operable to return a driver blade 2026 (FIG. 25) from the driven position to the ready position during each fastener driving cycle. If a fastener becomes jammed during a driving cycle, the driver blade 2026 may stop at an intermediate position between the driven position and the ready position. Like the lifter assemblies 62, 1062 described above, the lifter assembly 2062 is also operable to return the driver blade 2026 from the intermediate position to the ready position, thereby resetting the fastener driver 2010 for a subsequent fastener driving cycle.

Figure 23:
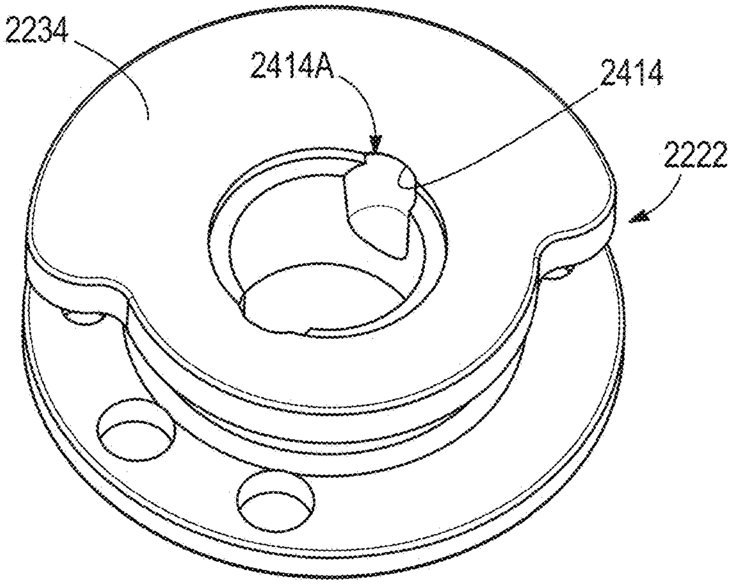
FIG. 23 is a perspective view of a rotary lifter of the lifter assembly of FIG. 21.

With reference to FIG. 23, the lifter assembly 2062 includes a rotary lifter 2222 coupled for co-rotation with a drive shaft 2106 (FIG. 24) of the gear train 2100 (FIG. 1). The rotary lifter 2222 includes a body 2234 and a plurality of pins 2238 (FIG. 21; only some of which are shown) that sequentially engage lift teeth 2094 (FIG. 25) formed on the driver blade 2026 as the driver blade 2026 is returned from the driven position toward the ready position. Torque from the motor 2042 is transferred through the gear train 2100, to the drive shaft 2106, and subsequently to the lifter 2222, which engages the driver blade 2026. Specifically, the pins 2238 of the lifter 2222 sequentially engage the corresponding lift teeth 2094 to move the driver blade 2026 from the driven position toward the ready position.

With continued reference to FIG. 23, the lifter 2222 has two cam grooves 2414 (only one of which is shown) equally spaced from each other about an inner periphery of the body 2234 of the lifter 2222. Each of the cam grooves 2414 includes a portion 2414A of which is inclined relative to the rotational axis 2246 defined by the drive shaft 2106 (FIG. 22).

Figure 22:
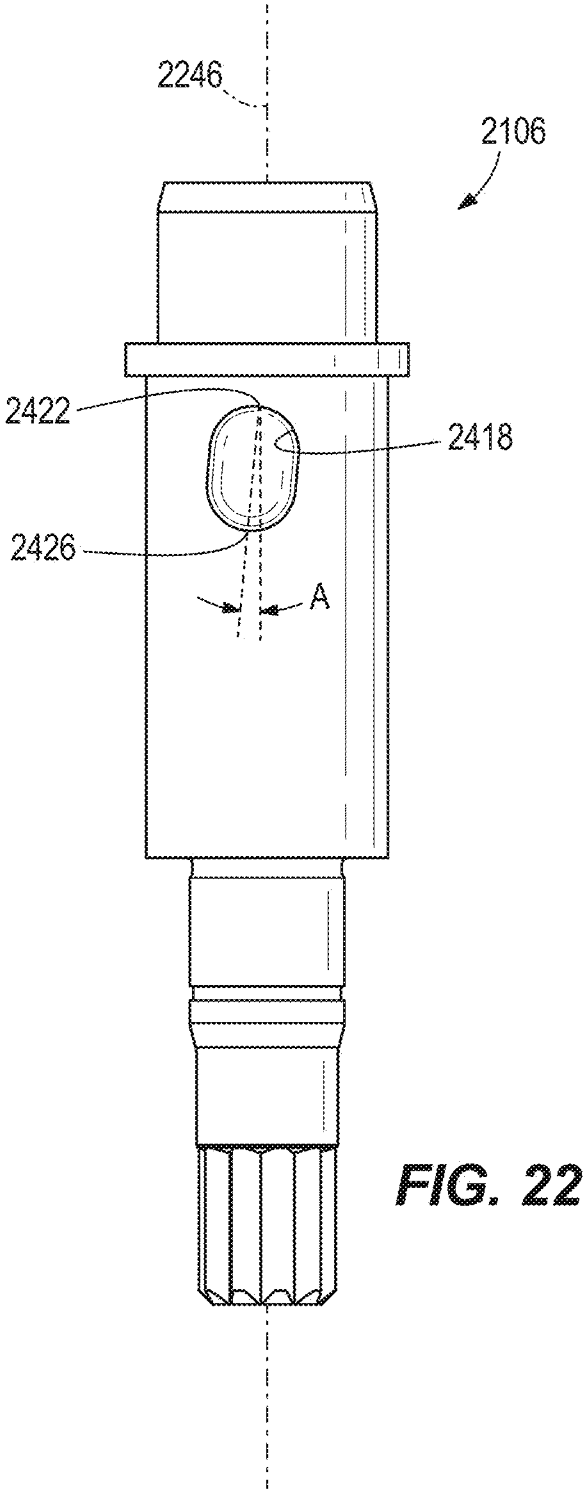
FIG. 22 is a plan view of a drive shaft of the lifter assembly of FIG. 21.
Figure 24:
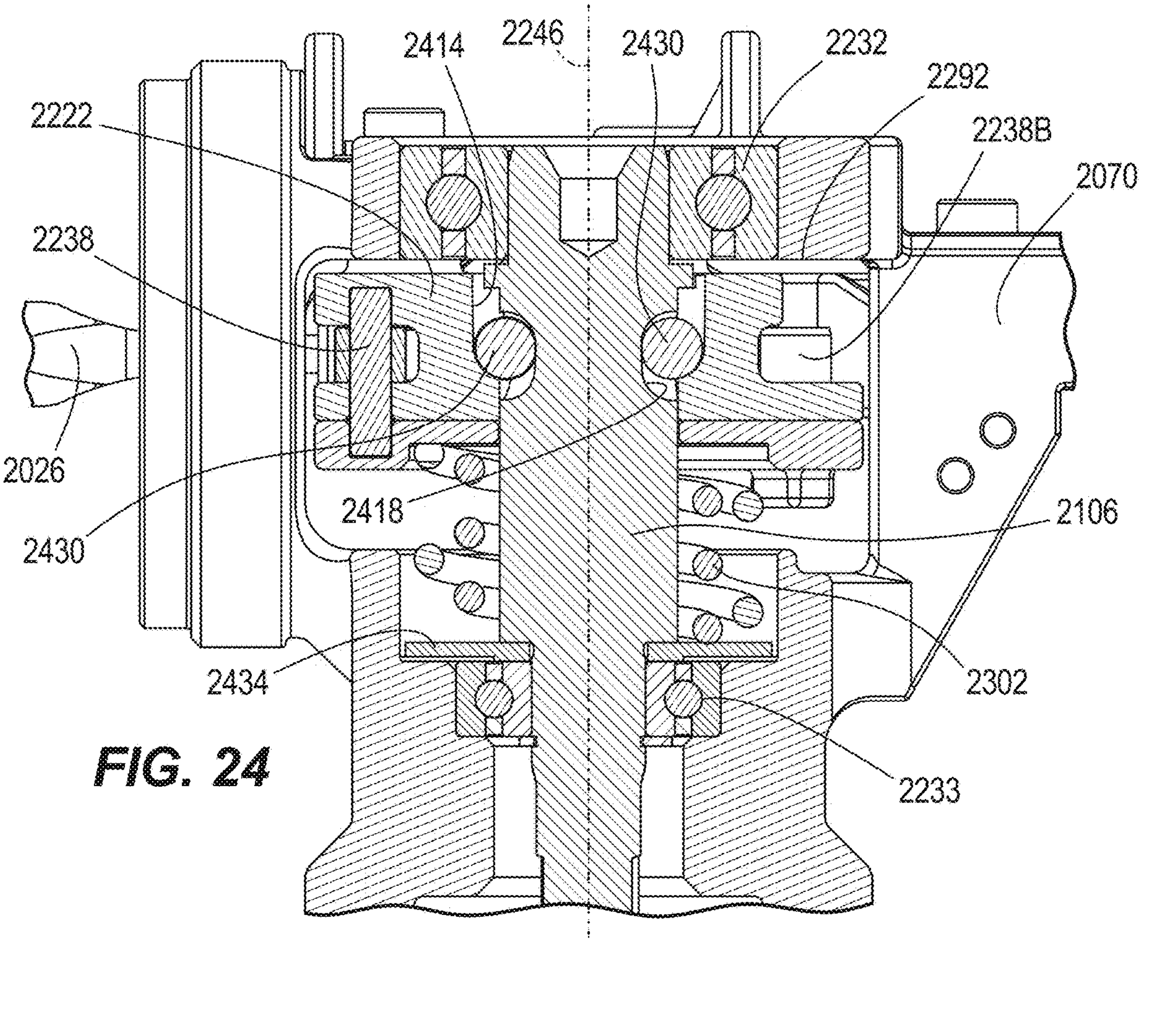
FIG. 24 is a partial cross-sectional view of the lifter assembly of FIG. 21 taken along lines 24-24 in FIG. 21, illustrating the rotary lifter in an engaged position with the driver blade.

With reference to FIG. 22, the drive shaft 2106 includes two cam grooves 2418 (only one of which is shown) equally spaced from each other about an outer periphery of the drive shaft 2106. Like the respective portions 2414A of the cam grooves 2414 in the lifter 2222, each of the cam grooves 2418 is inclined relative to the rotational axis 2246. More specifically, each cam groove 2418 includes a first end 2422 and a second end 2426, and the respective cam groove 2418 extends from the first end 2422 to the second end 2426 at an oblique angle A relative to the rotational axis 2246. The respective pairs of cam grooves 2414, 2418 in the lifter 2222 and the drive shaft 2106 are in facing relationship such that a cam member (e.g., a ball 2430) is received within each of the pairs of cam grooves 2414, 2418 (FIG. 24). The balls 2430 and the cam grooves 2414, 2418 effectively provide a cam arrangement between the lifter 2222 and the drive shaft 2106 for transferring torque between the lifter 2222 and the drive shaft 2106. As such, the rotary lifter 2222 receives torque from the drive shaft 2106 when the shaft 2106 rotates about its rotational axis 2246. Furthermore, similar to the lifter 1222 of FIG. 8, the lifter 2222 is axially movable on the drive shaft 2106.

With reference to FIG. 24, the lifter assembly 2062 further includes a spring 2302 for biasing the lifter 2222 along the rotational axis 2246 toward an engaged position. Specifically, the spring 2302 biases the lifter 2222 toward an interior surface 2292 of the frame 2070 in which a bearing 2232 is mounted to position the lifter 2222 in the engaged position in which the pins 2238 on the rotary lifter 2222 are engageable with the corresponding teeth 2094 on the driver blade 2026. The spring 2302 extends between a retaining ring 2434 on the drive shaft 2106 and the lifter 2222. The bearing 2232 rotatably supports the drive shaft 2106 at the upper interior surface 2292 of the frame 2070, whereas another bearing 2233 rotatably supports the opposite end of the drive shaft 2106 in the frame 2070.

During normal operation of the nailer 2010, torque from the drive shaft 2106 is transferred through the cam arrangement 2414, 2418, 2430 to the lifter 2222, causing the lifter 2222 to rotate. However, should the reaction torque applied to the lifter 2222 (e.g., by a jammed driver blade 2026) exceed a predetermined torque limit, the drive shaft 2106 will rotate relative to the lifter 2222, causing the balls 2430 to ride downward within the cam grooves 2418 from the frame of reference of FIG. 24. As the balls 2430 move in this manner within the cam grooves 2418, 2414, a downward displacement is imparted to the lifter 2222 to move axially (along axis 2246) away from the bearing 2232, against the bias of the spring 2302, and thus away from the engaged position shown in FIG. 24.

The cam grooves 2414, 2418 are inclined at the oblique angle A corresponding to the predetermined torque limit allowed between the output shaft 2106 and the lifter 2222, before the lifter 2222 will be moved away from the engaged position. In other words, once the predetermined torque limit is exceeded, relative rotation between the drive shaft 2106 and the lifter 2222 applies a force on the balls 2430 via the cam grooves 2418 having components resolved in a direction that is transverse to the rotational axis 2246 and a direction that is parallel with the rotational axis 2246. The component force acting in the direction that is parallel with the rotational axis 2246 displaces the lifter 2222 away from the engaged position (shown in FIG. 24, against the bias of the spring 2302) and toward a bypass position (shown in FIG. 26). The selection of the oblique angle A, and the stiffness of the spring 2302, allows for a sufficient amount of torque transmission between the drive shaft 2106 and the lifter 2222 before the reaction torque on the lifter 2222 moves the lifter 2222 toward the bypass position.

The axial movement of the lifter 2222 away from the engaged position also moves the pins 2238 "out of plane" with the driver blade 2026. Specifically, when the balls 2430 move from the first end 2422 toward the second end 2426 of the respective cam groove 2418 thereby axially moving the lifter 2222, a temporary gap 2306 (FIG. 26) may be created between a rear surface 2310 of the driver blade 2026 and the distal ends of the respective pins 2238A, 2238B (FIG. 21) on the lifter 2222. This may allow the pins 2238A, 2238B to slide behind the rear surface 2310 of the driver blade 2026. Alternatively, the spring 2302 may rebound quick enough such that the spring 2302 may bias the distal end of one of the pins 2238A, 2238B against the rear surface 2310 causing the pin 2238A, 2238B to contact the rear surface 2310 of the driver blade 2026 as the lifter 2222 moves toward the bypass position. As such, the distal ends of the pins 2238A, 2238B may slide against the rear surface 2310 of the driver blade 2026 as the lifter 2222 is moved toward the bypass position.

During a normal driving cycle in which a fastener is discharged into a workpiece, the lifter 2222 returns the piston and the driver blade 2026 from the driven position to the ready position. Once in the ready position, the piston and the driver blade 2026 are held until released by user activation of a trigger 2066 (FIG. 1), which initiates a driving cycle. When released, the compressed gas above the piston drives the piston and the driver blade 2026 toward the driven position, thereby driving a fastener into a workpiece. The piston and driver blade 2026 are then returned again toward the ready position, which is near a true TDC position of the piston and driver blade 2026.

Specifically, when the trigger 2066 is actuated and the piston and the driver blade 2026 are at the ready position, the controller activates the motor 2042. The motor 2042 supplies torque to the gear train 2100 and begins rotating the lifter 2222. After a small amount of rotation, the last pin 2238C of the lifter 2222 disengages the lowermost tooth 2094 on the driver blade 2026, and the piston and the driver blade 2026 are thrust downward toward the driven position by the compressed air above the piston. In some embodiments, the lifter 2222 may raise the driver blade 2026 past the ready position toward the TDC position before the driver blade 2026 is driven toward the driven position. After driving a fastener into a workpiece, the driver blade 2026 is in the driven or BDC position. Throughout the fastener driving cycle, the balls 2430 remain proximate the first end 2422 of the respective cam groove 2418 for transferring the torque from the drive shaft 2106 to the lifter 2222.

During a fastener driving cycle, the driver blade 2026 may stop at an intermediate position (FIG. 25) between the ready position and the driven position as a result of a fastener jamming within the driver 2010. When the driver blade 2026 is in the intermediate position, the first pin 2238A may jam against one of the teeth 2094 on the driver blade 2026, imparting a reaction torque on the lifter 2222 that exceeds the predetermined torque limit. As described above, the lifter 2222 is moved from the engaged position (FIG. 24) toward the bypass position (FIG. 26) against the bias of the spring 2302.

Figure 25:
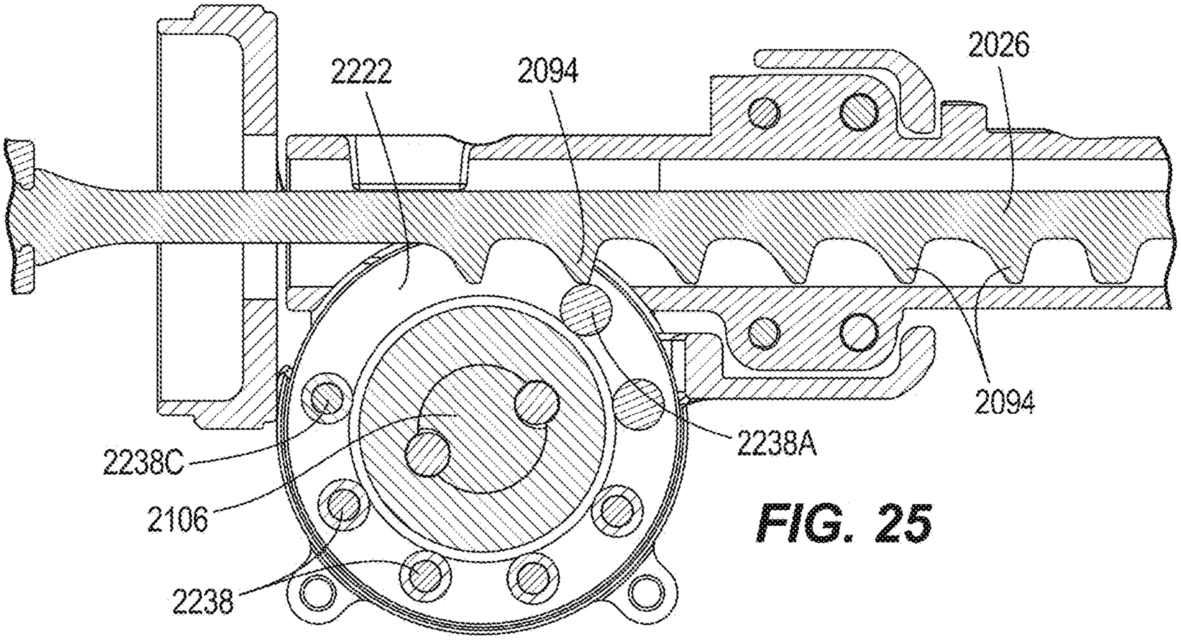
FIG. 25 is a front cross-sectional view of the lifter assembly of FIG. 21 taken along lines 25-25 in FIG. 21, illustrating a driver blade of the lifter assembly in an intermediate position between a ready position and a driven position in response to a fastener jam.
Figure 26:
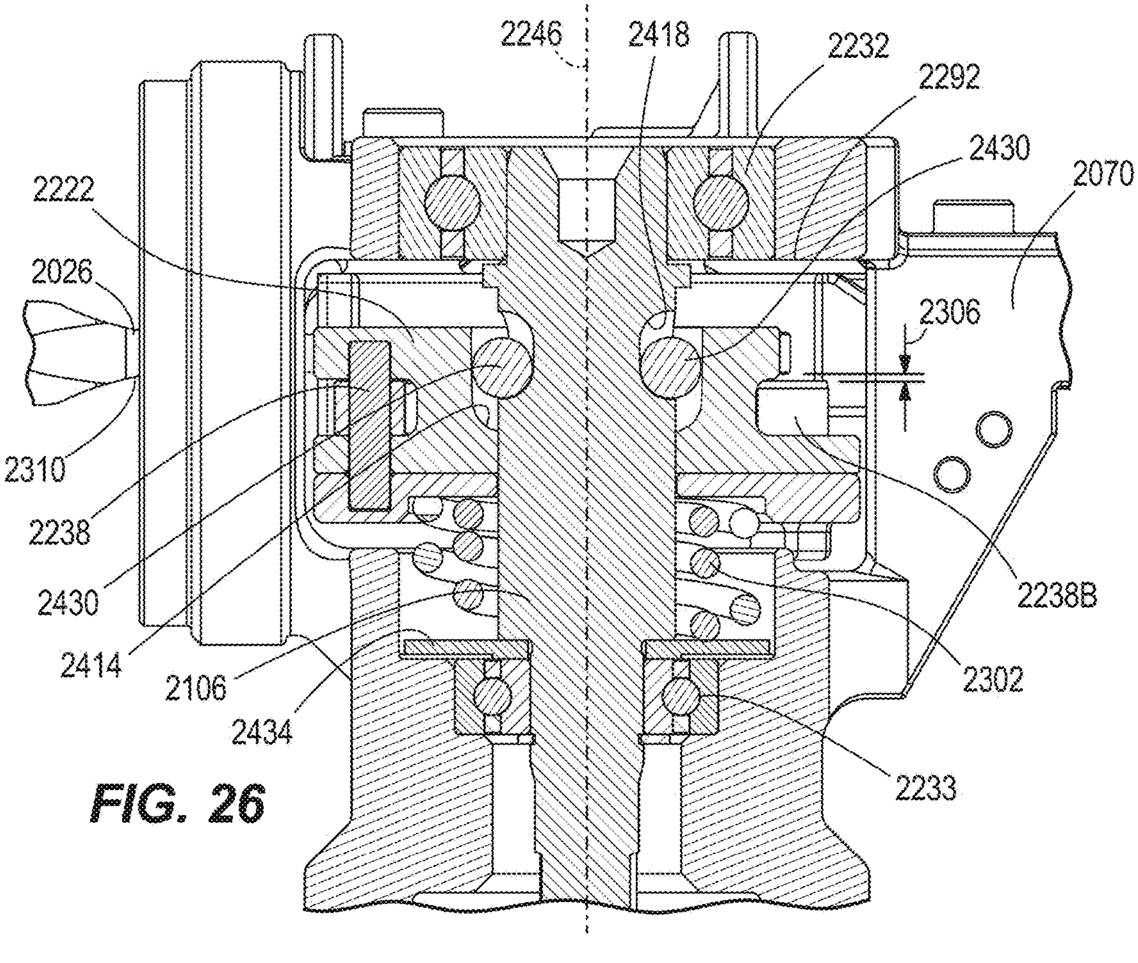
FIG. 26 is another partial cross-sectional view of the lifter assembly of FIG. 21 illustrating the rotary lifter moved to a bypass position when the driver blade is stopped at the intermediate position as shown in FIG. 25.
Figure 27:
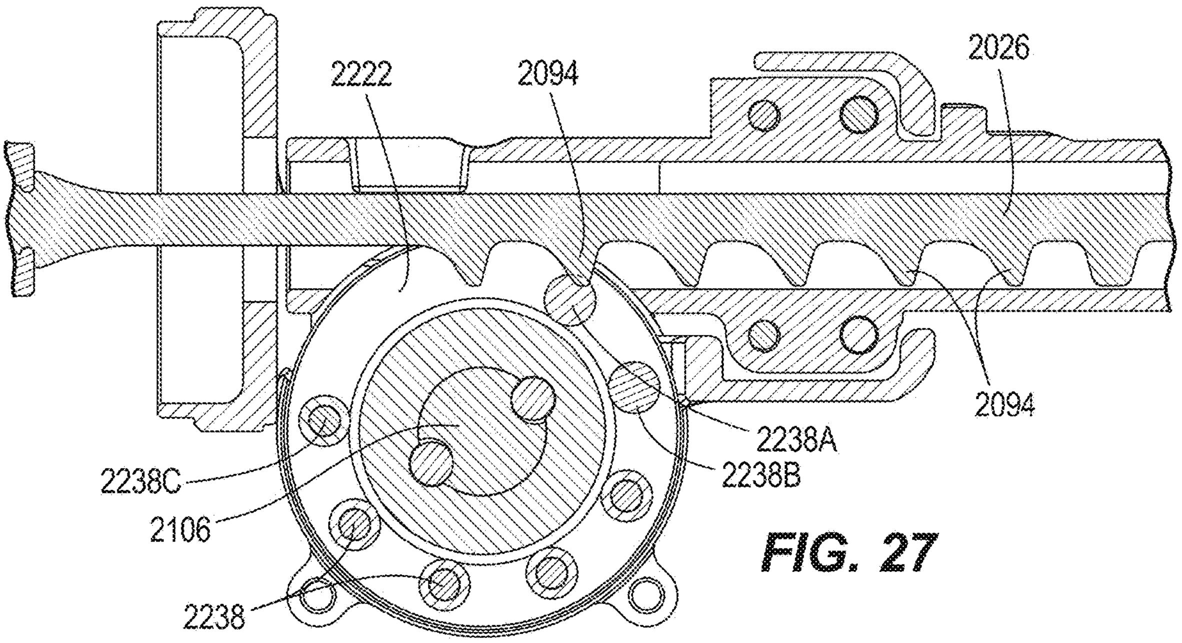
FIG. 27 is another front cross-sectional view of the lifter assembly of FIG. 21 illustrating a first lifter pin bypassing behind one of the lift teeth on the driver blade, which is stopped at the intermediate position as shown in FIG. 25.
Figure 28:
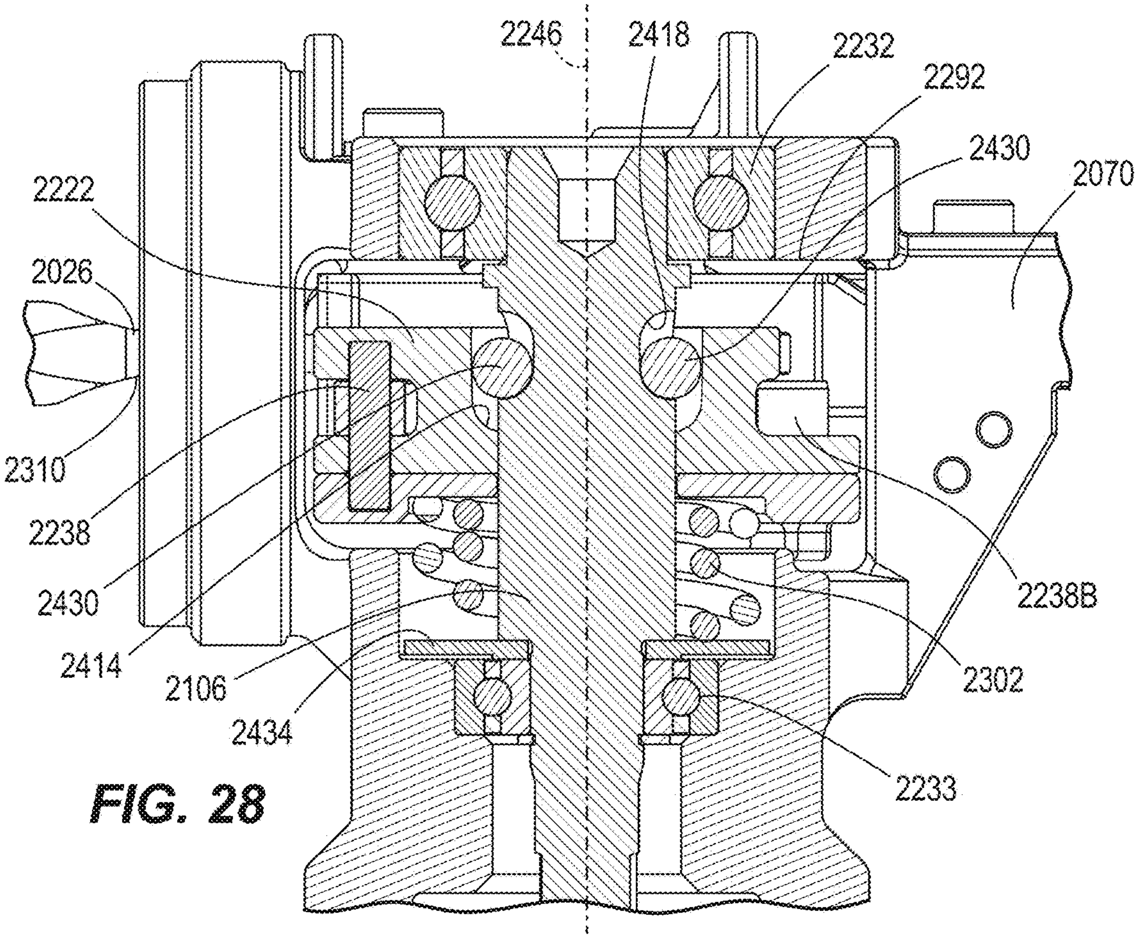
FIG. 28 is another partial cross-sectional view of the lifter assembly of FIG. 21 illustrating the rotary lifter in the bypass position when the first lifter pin is bypassing the lift tooth on the driver blade, which is stopped at the intermediate position as shown in FIG. 27.
Figure 29:
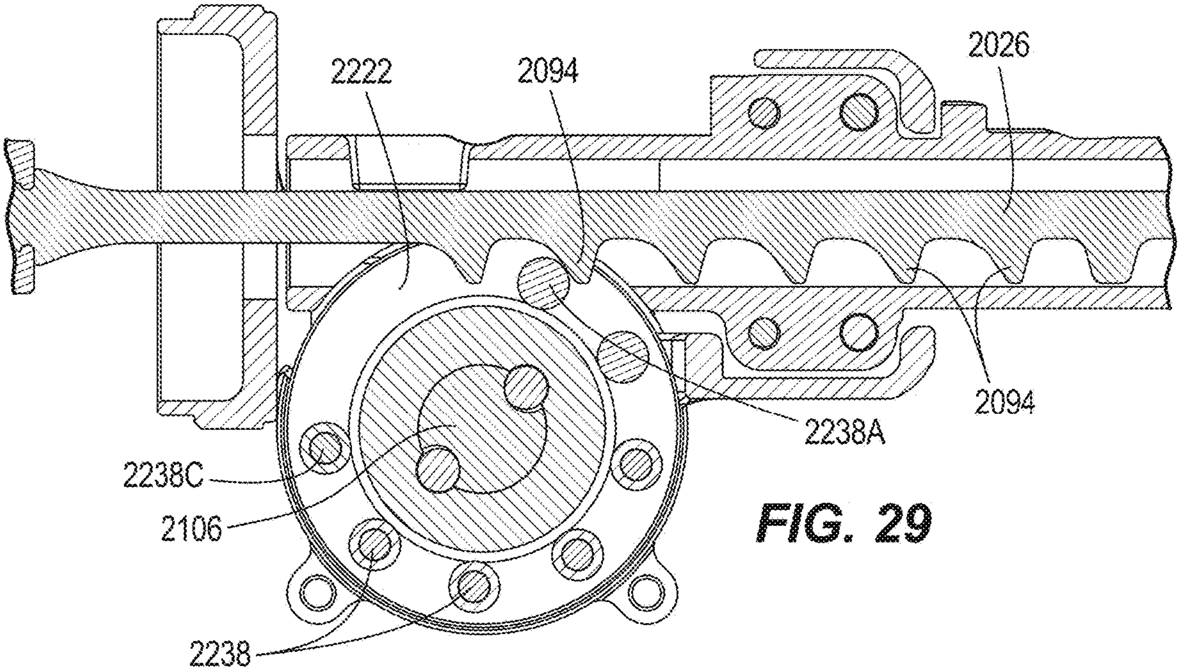
FIG. 29 is another front cross-sectional view of the lifter assembly of FIG. 21 illustrating the rotary lifter in the bypass position after the first lifter pin emerges from behind the lift tooth on the driver blade.

The drive shaft 2106 rotates relative to the lifter 2222 such that the balls 2430, guided along a path defined by the respective pair of cam grooves 2414, 2418, apply a downward axial force to the lifter 2222 thereby moving the lifter 2222 from the engaged position (FIG. 25) toward the bypass position (FIG. 29). Although the lifter 2222 is only shown at its bypass position (i.e., its farthest axial position relative to the interior surface 2292 of the frame 2070) in each of the FIGS. 26, 28, and 30, the lifter 2222 progressively moves from the engaged position to the bypass position in response to one of the lift pins (e.g., first lift pin 2238A) becoming jammed against one of the drive teeth 2094 when the driver blade 2026 is stopped at the intermediate position as shown in FIG. 25. Once in the bypass position, the first pin 2238A clears the particular drive tooth 2094 against which it was jammed, permitting the lifter 2222 to resume rotation with the drive shaft 2106. At this time, with the lifter 2222 in the bypass position, the first pin 2238A passes behind the rear surface 2310 of the tip of the drive tooth 2094 (as shown in FIG. 27). In some embodiments of the driver 2010, the spring 2302 biases the first pin 2238A to contact the rear surface 2310 of the drive tooth 2094 as the first pin 2238A slides behind the drive tooth 2094. And, in other embodiments of the driver 2010, the gap 2306 shown in FIG. 26 is maintained while the first pin 2238A passes behind the rear surface 2310 of the drive tooth 2094, such that the first pin 2238A skips over the drive tooth 2094.

Figure 30:
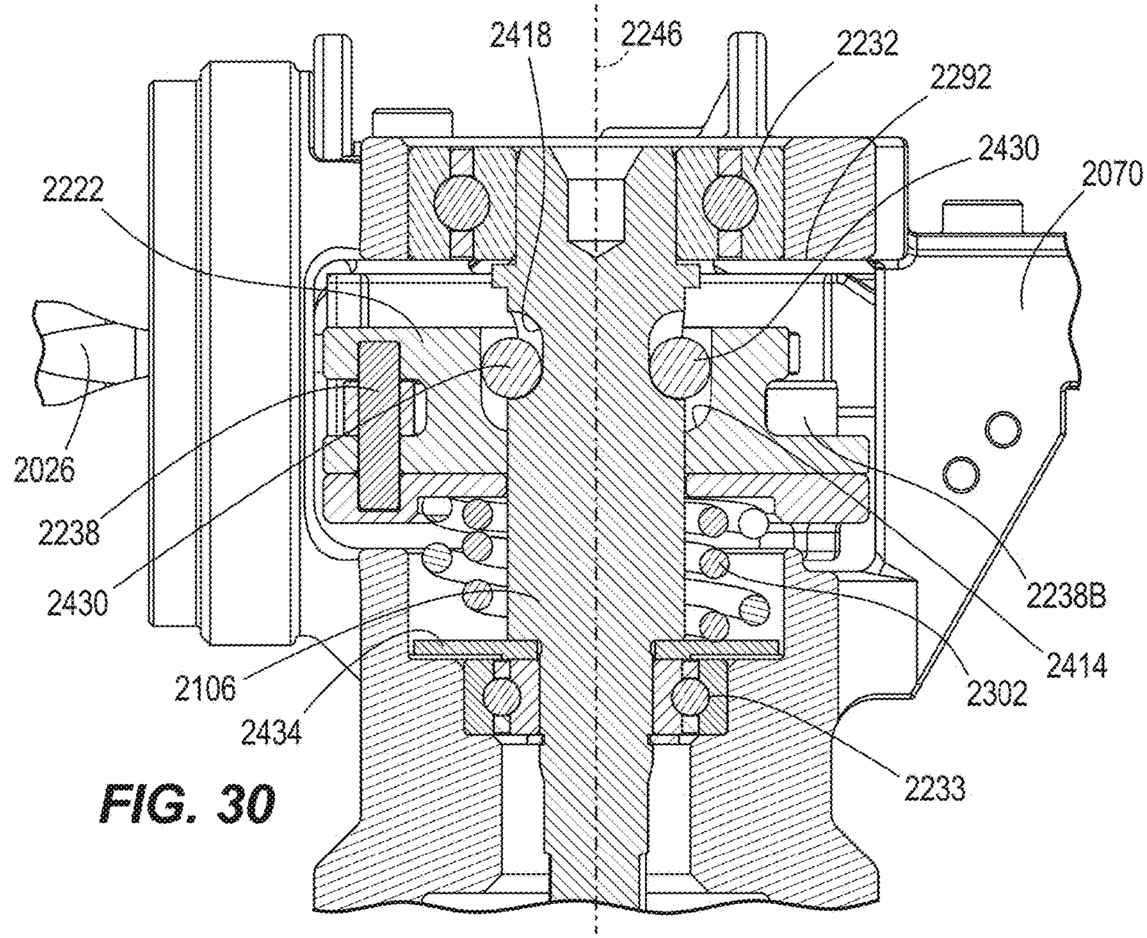
FIG. 30 is another partial cross-sectional view of the lifter assembly of FIG. 21 illustrating the rotary lifter in the bypass position as shown in FIG. 29.
Figure 31:
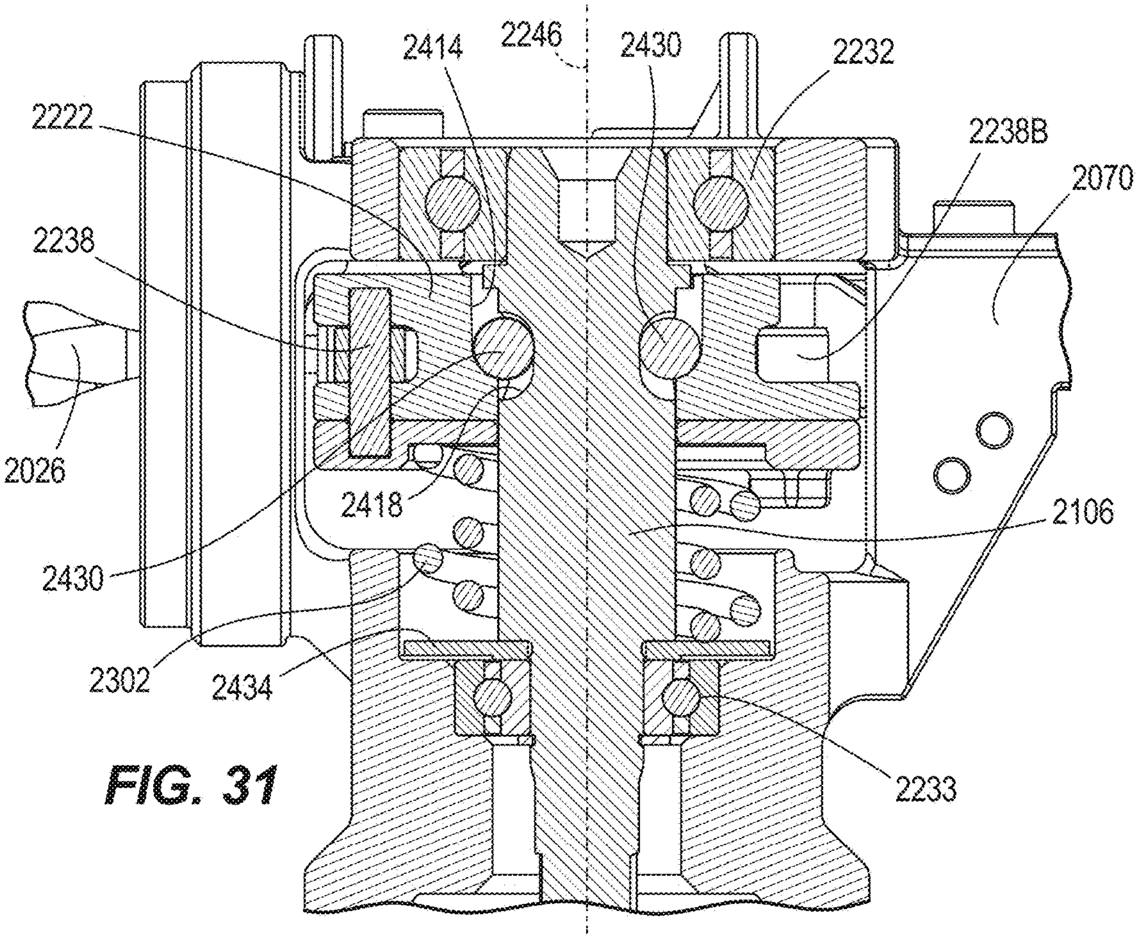
FIG. 31 is another partial cross-sectional view of the lifter assembly of FIG. 21 illustrating the rotary lifter returned to the engaged position.
Figure 32:
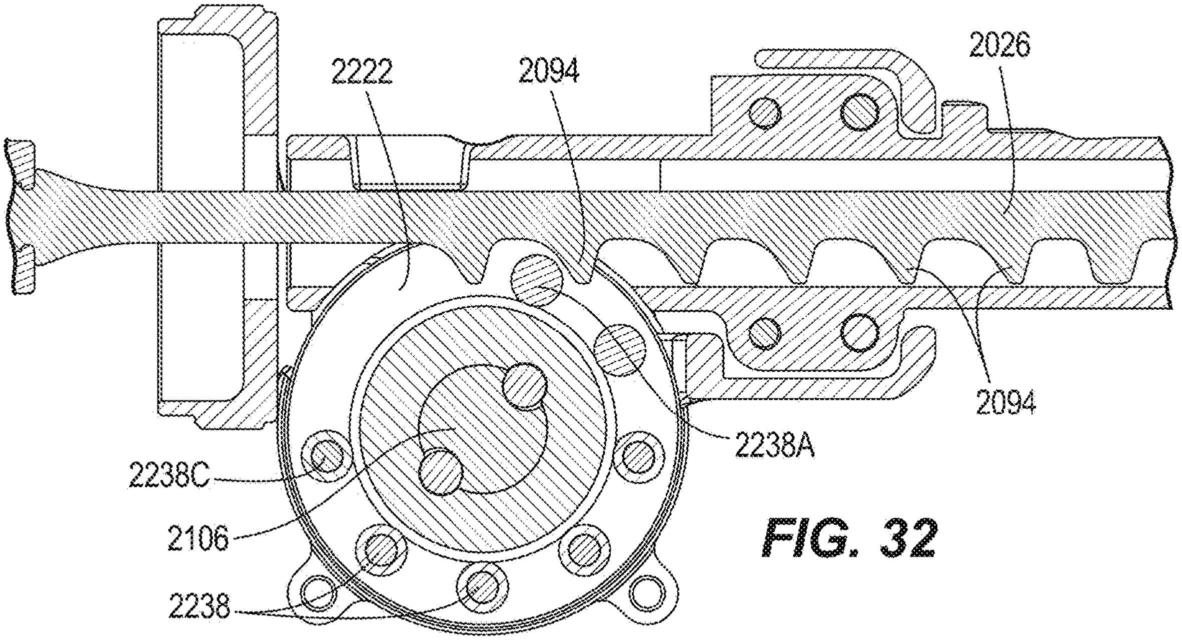
FIG. 32 is another front cross-sectional view of the lifter assembly of FIG. 21 illustrating the rotary lifter in the engaged position with the first lifter pin located between adjacent teeth on the driver blade.

Once the lifter 2222 reaches the bypass position, the balls 2430 are located proximate the second end 2426 of the cam grooves 2418 as shown in FIG. 30. Subsequently, the jam is cleared between the first pin 2238A and the drive tooth 2094, and the lifter 2222 begins to rotate with the drive shaft 2106, thereby positioning the first pin 2238A in alignment with the space between the lift teeth 2094. The spring 2302 then rebounds and translates the lifter 2222 to the engaged position (FIG. 31) from the bypass position (FIG. 30). Subsequently, the pins 2238 are in plane with the drive teeth 2094 and the lifter 2222 returns the driver blade 2026 to the ready position from the intermediate position. Once the one or more sensors indicate to the controller that the driver blade 2026 has reached the ready position, the controller deactivates the motor 2042 and the fastener driver 2010 is ready for a subsequent fastener driving cycle.

Unlike the lifter assemblies 62, 1062 of the previous embodiments, the reciprocating lifter 2222 is moved out of plane, and then back into plane with the driver blade 2026, only when a fastener jam occurs (i.e., not with every single revolution of the lifter 222, 1222 for each fastener driving cycle).

Various features of the invention are set forth in the following claims.

What is claimed is:

1. A powered fastener driver comprising:
- a driver blade movable from a top-dead-center (TDC) position toward a driven or bottom-dead-center (BDC) position for driving a fastener into a workpiece;
- a gas spring mechanism for driving the driver blade toward the BDC position;
- a lifter assembly having a rotary lifter for returning the driver blade from the BDC position toward the TDC position;
- an arm upon which the rotary lifter is supported;
- a motor which, in a first position of the rotary lifter, provides torque to the rotary lifter to return the driver blade from the BDC position toward the TDC position; and
- a brake mechanism including an electromagnet which, when activated, causes the rotary lifter to move from the first position toward a second position in which the rotary lifter is not engageable with the driver blade.

2. The powered fastener driver of claim 1, wherein the electromagnet, when activated, prevents transmission of torque from the motor to the rotary lifter.

3. The powered fastener driver of claim 2, wherein the electromagnet, when activated, directs torque toward the arm to rotate the arm, thereby rotating the rotary lifter toward the second position.

4. The powered fastener driver of claim 1, wherein the lifter assembly includes a drive gear between the motor and the rotary lifter for transferring torque from the motor to the rotary lifter.

5. The powered fastener driver of claim 4, wherein the lifter assembly further includes a gear and a shaft coupling the gear and the rotary lifter for co-rotation, wherein the gear is meshed with the drive gear, and wherein the shaft is rotatably supported by the arm.

6. The powered fastener driver of claim 1, wherein the brake mechanism includes a planetary gear train having at least one ring gear and a plurality of planet gears, the at least one ring gear including the arm, wherein the plurality of planet gears rotate relative to the at least one ring gear when the rotary lifter is in the first position, and wherein the at least one ring gear is configured to selectively rotate relative to plurality of planet gears when the brake mechanism is activated to pivot the arm about a pivot axis toward the second position.

7. A powered fastener driver comprising:

a driver blade movable from a top-dead-center (TDC) position toward a driven or bottom-dead-center (BDC) position for driving a fastener into a workpiece, the driver blade defining a driving plane;

a gas spring mechanism for driving the driver blade toward the BDC position;

a lifter assembly having a rotary lifter for returning the driver blade from the BDC position toward the TDC position, and a motor that provides torque to the rotary lifter to return the driver blade from the BDC position toward the TDC position, wherein the rotary lifter includes a cam portion which, during rotation of the rotary lifter, causes the rotary lifter to axially move along a rotational axis defined by the rotary lifter between a first position, in which the rotary lifter is in the driving plane, and a second position, in which the rotary lifter is out of the driving plane.

8. The powered fastener driver of claim 7, wherein when the rotary lifter is the driving plane, the rotary lifter is engageable with the driver blade, and wherein when the rotary lifter is out of the driving plane, the rotary lifter is not engageable with the driver blade.

9. The powered fastener driver of claim 7, further comprising a frame rotatably supporting the rotary lifter, wherein the cam portion is a first cam portion, wherein the powered fastener driver further includes a second cam portion extending from the frame toward the rotary lifter, and wherein the first cam portion and the second cam portion are selectively engageable for axially moving the rotary lifter along the rotational axis.

10. The powered fastener driver of claim 9, wherein each of the first cam portion and the second cam portion includes a first surface that is inclined relative to the rotational axis, and a second surface that is adjacent the first surface and perpendicular to the rotational axis.

11. The powered fastener driver of claim 10, wherein the first surface of the first cam portion engages with the first surface of the second cam portion to axially move the rotary lifter along the rotational axis from the first position toward the second position.

12. The powered fastener driver of claim 11, wherein the lifter assembly includes a spring biasing the rotary lifter toward the first position, wherein the second surface of the first cam portion engages with the second surface of the second cam portion after the engagement between the first surfaces of the first and second cam portions, and wherein after the second surface of the first cam portion moves past the second surface of the second cam portion, the spring is configured to bias the rotary lifter from the second position toward the first position.

13. The powered fastener driver of claim 7, wherein the cam portion is positioned at a predetermined circumferential position to axially move the rotary lifter from the first position toward the second position after the driver blade reaches the BDC position, but before a first lifter pin of the rotary lifter engages the driver blade to begin returning the driver blade toward the TDC position.

* * * * *